United States Patent
Kim et al.

(10) Patent No.: US 10,985,463 B2
(45) Date of Patent: Apr. 20, 2021

(54) LOOP TYPE ANTENNA AND ELECTRONIC DEVICE INCLUDING SAME

(71) Applicant: Samsung Electronics Co., Ltd., Suwon-si (KR)

(72) Inventors: Jihoon Kim, Suwon-si (KR); Jiyong Kim, Suwon-si (KR); Jongin Lee, Suwon-si (KR); Yeonjeong Kim, Suwon-si (KR); Hyoseok Na, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/939,503

(22) Filed: Jul. 27, 2020

(65) Prior Publication Data

US 2020/0381830 A1 Dec. 3, 2020

Related U.S. Application Data

(63) Continuation of application No. PCT/KR2019/001035, filed on Jan. 24, 2019.

(30) Foreign Application Priority Data

Jan. 25, 2018 (KR) ........................ 10-2018-0009093

(51) Int. Cl.
*H01Q 1/24* (2006.01)
*H01Q 7/00* (2006.01)
(Continued)

(52) U.S. Cl.
CPC ............... *H01Q 7/00* (2013.01); *H01Q 1/241* (2013.01); *H01Q 1/42* (2013.01); *H01Q 1/48* (2013.01); *H04B 1/40* (2013.01)

(58) Field of Classification Search
CPC ............ H01Q 7/00; H01Q 1/42; H01Q 1/241; H01Q 1/48; H04B 1/40
See application file for complete search history.

(56) References Cited

U.S. PATENT DOCUMENTS 9,024,725 B2 5/2015 Ikemoto
9,350,077 B1 5/2016 Zheng et al.
(Continued)

FOREIGN PATENT DOCUMENTS

JP 4010927 B2 11/2007
JP 5588519 B2 9/2014
(Continued)

OTHER PUBLICATIONS

IEEE Standard for Information technology—Telecommunications and information exchange between systems Local and metropolitan area networks—Specific requirements, Part 11: Wireless LAN Medium Access Control (MAC) and Physical Layer (PHY) Specifications, Amendment 3: Enhancements for Very High Throughput in the 60 GHz Band, IEEE Std 802.11ad™-2012, Dec. 28, 2012.
(Continued)

*Primary Examiner* — Dieu Hien T Duong
(74) *Attorney, Agent, or Firm* — Jefferson IP Law, LLP

(57) ABSTRACT

According to various embodiments, an electronic device comprises: a first plate; a second plate facing the opposite direction of the first plate; a housing including a lateral member for encompassing the space between the first plate and the second plate; and an antenna structure, wherein the antenna structure includes: a plurality of insulating layers arranged in a stacked manner so as to be parallel to the first plate; a loop antenna array formed by the insulating layers and/or by the peripheries of the insulating layers; and a wireless communication circuit electrically connected to loop antennas, and configured to transmit and receive a first
(Continued)

signal having a first frequency of a range of 3 GHz to 100 GHz.

15 Claims, 31 Drawing Sheets

(51) Int. Cl.
*H01Q 1/42* (2006.01)
*H01Q 1/48* (2006.01)
*H04B 1/40* (2015.01)

(56) References Cited

U.S. PATENT DOCUMENTS

| | | |
|---|---|---|
| 9,502,771 B2 | 11/2016 | Harper et al. |
| 2007/0132641 A1* | 6/2007 | Korva .................. H01Q 9/0421 343/700 MS |
| 2008/0158069 A1 | 7/2008 | Mateus Mendes et al. |
| 2011/0199272 A1 | 8/2011 | He et al. |
| 2014/0306856 A1 | 10/2014 | Fan et al. |
| 2015/0381229 A1 | 12/2015 | Tzanidis et al. |
| 2016/0073221 A1 | 3/2016 | Yang et al. |
| 2016/0093939 A1 | 3/2016 | Kim et al. |
| 2017/0054205 A1 | 2/2017 | Feldman et al. |
| 2017/0155185 A1* | 6/2017 | Hong ....................... H01Q 1/38 |
| 2017/0338546 A1 | 11/2017 | Wong et al. |
| 2017/0338551 A1 | 11/2017 | Rahman et al. |

FOREIGN PATENT DOCUMENTS

| | | |
|---|---|---|
| KR | 10-1155278 B1 | 6/2012 |
| KR | 10-2010-0065445 A | 12/2012 |
| KR | 10-2016-0036436 A | 4/2016 |
| KR | 10-2017-0016377 A | 2/2017 |
| WO | 2016/003237 A1 | 1/2016 |

OTHER PUBLICATIONS

European Search Report dated Jan. 26, 2021; European Appln. No. 19744449.0-1205/3734761 PCT/KR2019001035.

* cited by examiner

LOOP TYPE ANTENNA AND ELECTRONIC DEVICE INCLUDING SAME

CROSS-REFERENCE TO RELATED APPLICATION(S)

This application is a continuation application, claiming priority under § 365(c), of an International application No. PCT/KR2019/001035, filed on Jan. 24, 2019, which was based on and claimed the benefit of a Korean patent application number 10-2018-0009093, filed on Jan. 25, 2018, in the Korean Intellectual Property Office, the disclosure of which is incorporated by reference herein in its entirety.

TECHNICAL FIELD

Various embodiments of the disclosure relate to a loop type antenna and an electronic device including the same.

BACKGROUND ART

With the development of wireless communication technologies, electronic devices (e.g., electronic devices for communication) are universally used in daily life, and thus use of content is exponentially increasing. Due to this rapid increase in the use of content, network capacities have reached their limits. As low-latency data communication is required, high-speed wireless communication technologies such as next-generation wireless communication technology (e.g., 5G communication) or wireless gigabit alliance (WI-GIG) (e.g., 802.11AD) have been developed.

DISCLOSURE OF INVENTION

Technical Problem

In the next-generation wireless communication technology, millimeter waves of substantially 20 GHz or higher may be used, and an array structure in which a plurality of antenna elements are arranged at fixed intervals to overcome a high free-space loss in view of frequency characteristics and increase a gain of an antenna may be used. Such an array antenna may be formed such that a plurality of conductive patterns used as radiators are disposed on a board at fixed intervals. The conductive patterns may be disposed around an edge on a one-dimensional plane of the board, and may be generally implemented in a dipole antenna type.

However, the dipole antenna type conductive patterns are not disposed at a substantial edge of the board due to production restrictions, are disposed at a position spaced inward apart from the edge to any extent, allow a considerable portion of the antenna gain to be obstructed by a board surface due to inherent characteristics of the dipole antenna, and thus can cause a reduction in bandwidth.

According to various embodiments, the disclosure can provide a loop type antenna and an electronic device including the same.

According to various embodiments, a loop type antenna, radiation characteristics of which can be improved at an end of a board, and an electronic device including the same can be provided.

According to various embodiments, a loop type antenna formed to have a relatively high gain and wide bandwidth, and an electronic device including the same can be provided.

Solution to Problem

According to various embodiments, an electronic device includes: a housing configured to include a first plate, a second plate facing away from the first plate, and a lateral member surrounding a space between the first plate and the second plate; an antenna structure, wherein the antenna structure includes a plurality of insulating layers disposed in such a way as to be stacked parallel to the first plate, and an array of loop antennas formed through the plurality of insulating layers and/or peripheries of the plurality of insulating layers; and a wireless communication circuit electrically connected to the loop antennas and set to transmit/receive a first signal having a first frequency of a range of 3 GHz to 100 GHz.

Advantageous Effects of Invention

Since an antenna according to various embodiments of the disclosure is disposed in a substantially edge region of a board and is operated in a loop type, radiation characteristics of the antenna can be improved at an end of the board, and gain and bandwidth can be improved.

BEST MODE FOR CARRYING OUT THE INVENTION

Figure 1:
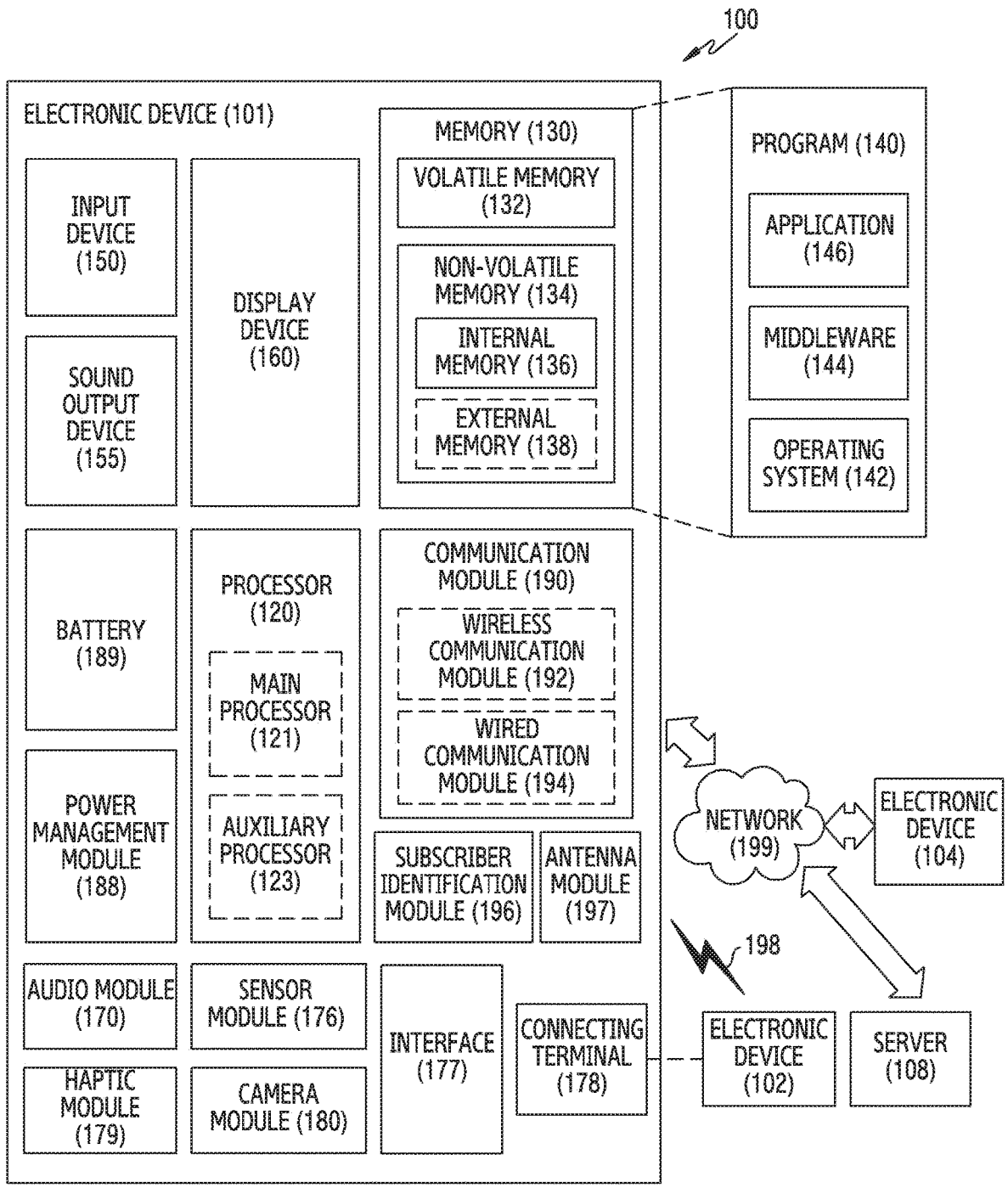
FIG. 1 is a block diagram of an electronic device within a network environment according to various embodiments of the disclosure.

FIG. 1 is a block diagram illustrating an electronic device in a network environment according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
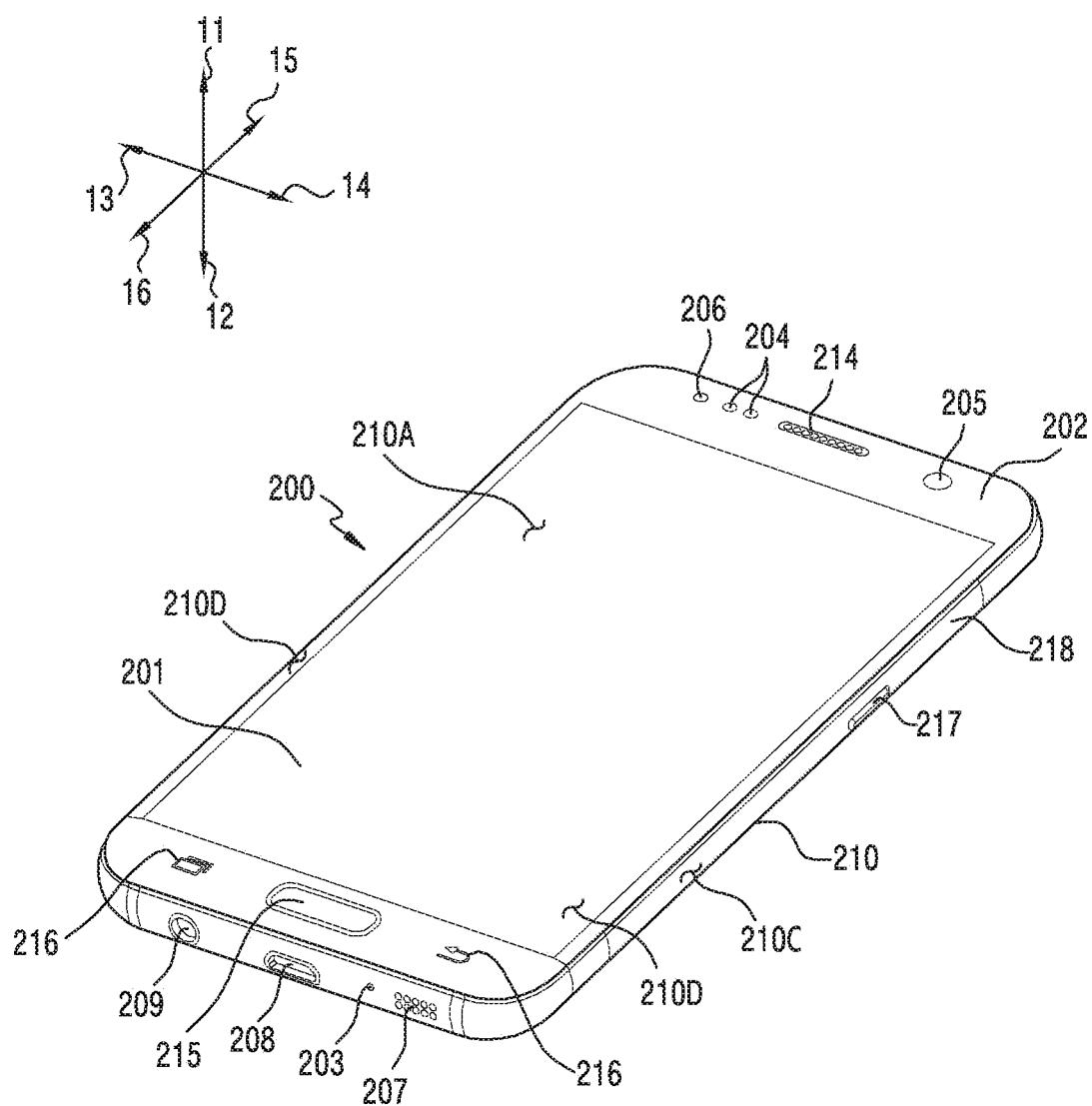
FIG. 2A is a perspective view of a mobile electronic device according to various embodiments of the disclosure.
Figure 2B:
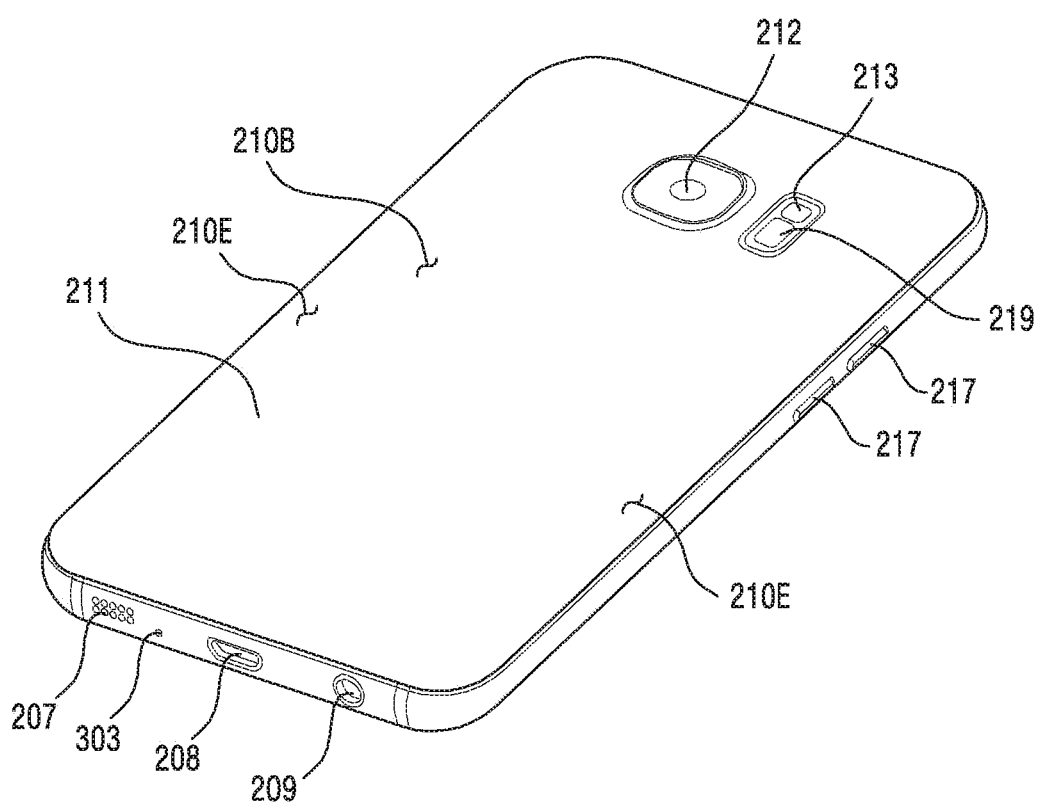
FIG. 2B is a rear perspective view of the electronic device of FIG. 2A according to various embodiments of the disclosure.

FIG. 2A is a perspective view of a mobile electronic device according to various embodiments of the disclosure. FIG. 2B is a rear perspective view of the electronic device of FIG. 2A according to various embodiments of the disclosure.

Referring to FIGS. 2A and 2B, an electronic device 200 according to an embodiment may include a housing 210 that includes a first surface (or a front surface) 210A, a second surface (or a rear surface) 210B, and a lateral surface 210C that surrounds a space between the first surface 210A and the second surface 210B. In another embodiment (not illustrated), the housing may be called a structure in which some of the first surface 210A, the second surface 210B, and the lateral surface 210C of FIG. 2A and FIG. 2B are disposed. According to an embodiment, the first surface 210A may be formed by a front plate 202 (e.g., a glass plate or a polymer plate including various coating layers), at least a part of which is substantially transparent. The second surface 210B may be formed by a substantially opaque rear plate 211. The rear plate 211 may be formed of, for instance, a coated or colored glass, a ceramic, a polymer, a metal (e.g., aluminum, stainless steel (STS), or magnesium), or a combination of at least two thereof. The lateral surface 210C may be joined with the front plate 202 and the rear plate 211, and may be formed by a lateral bezel structure (or a "lateral member") 218 including a metal and/or a polymer. In any embodiment, the rear plate 211 and the lateral bezel structure 218 may be integrally formed, and may include the same material (e.g., a metallic material such as aluminum).

In the illustrated embodiment, the front plate 202 may include first regions 210D, which are bent and seamlessly extend from the first surface 210A toward the rear plate, at both long edges of the front plate. In the illustrated embodiment (see FIG. 2A), the rear plate 211 may include second regions 210E, which are bent and seamlessly extend from the second surface 210B toward the front plate, at both long edges thereof. In any embodiment, the front plate or the rear plate may include only either the first regions or the second regions. In the embodiments, when viewed from the lateral surface of the electronic device, the lateral bezel structure may have a first thickness (or width) on the side of the lateral surface in which the first regions or the second regions are not included, and a second thickness thinner than the first thickness on the side of the lateral surface that includes the first regions or the second regions.

According to an embodiment, the electronic device 200 may include at least one or more of a display 201, audio modules 203, 207, and 214, sensor modules 204 and 219, camera modules 205, 212, and 213, key input devices 215, 216, and 217, an indicator 206, and connector holes 208 and 209. In any embodiment, the electronic device 200 may omit at least one (e.g., the key input devices 215, 216, and 217, or the indicator 206) of the constituent elements, or additionally include another constituent element.

The display 201 may be exposed, for instance, through a considerable portion of the front plate 202. In any embodiment, at least a part of the display 201 may be exposed through the first surface 210A and the front plate 202 at which the first regions 210D of the lateral surface 210C are disposed. The display 201 may be joined with or disposed adjacent to a touch sensor circuit, a pressure sensor capable of measuring an intensity (a pressure) of a touch, and/or a digitizer that detects a stylus pen based on a magnetic field. In any embodiment, at least a part of the sensor modules 204 and 219, and/or at least a part of the key input devices 215, 216, and 217 may be disposed in the first regions 210D and/or the second regions 210E.

The audio modules 203, 207, and 214 may include a microphone hole 203 and speaker holes 207 and 214. A microphone for obtaining an external sound may be disposed in the microphone hole 203 and, in any embodiment, a plurality of microphones may be disposed to be able to detect a direction of the sound. The speaker holes 207 and 214 may include an external speaker hole 207 and a receiver hole 214 for communication. In any embodiment, the speaker holes 207 and 214 and the microphone hole 203 may be implemented by one hole, or a speaker (e.g., a piezo speaker) may be included without the speaker holes 207 and 214.

The sensor modules 204 and 219 may produce an electric signal or a data value that corresponds to an internal operation state of the electronic device 200 or an external environment state. The sensor modules 204 and 219 may include, for instance, a first sensor module 204 (e.g., a proximity sensor) and/or a second sensor module (not illustrated) (e.g., a fingerprint sensor) that is disposed on the first surface 210A of the housing 210, and/or a third sensor modules 219 (e.g., an HRM sensor) that is disposed on the second surface 210B of the housing 210. The fingerprint sensor may be disposed on the first surface 210A (e.g., a home key button 215) as well as the second surface 210B of the housing 210. The electronic device 200 may further include at least one of sensor modules (not illustrated), for instance, a gesture sensor, a gyro sensor, a barometric sensor, a magnetic sensor, an acceleration sensor, a grip sensor, a color sensor, an infrared (IR) sensor, a biological sensor, a temperature sensor, a humidity sensor, or an illuminance sensor 204.

The camera modules 205, 212, and 213 may include a first camera device 205 disposed on the first surface 210A of the electronic device 200, a second camera device 212, and/or a flash 213 disposed on the second surface 210B. The camera modules 205 and 212 may include one or more lenses, an image sensor, and/or an image signal processor. The flash 213 may include, for instance, a light-emitting diode or a xenon lamp. In any embodiment, two or more lenses (wide-angle and long-distance lenses) and image sensors may be disposed on one surface of the electronic device 100.

The key input devices 215, 216, and 217 may include a home key button 215 disposed on the first surface 210A of the housing 210, a touch pad 216 disposed around the home key button 215, and/or a side key button 217 disposed on the lateral surface 210C of the housing 210. In another embodiment, the electronic device 200 may not include some or all of the above-mentioned key input devices 215, 216, and 217, and the excluded key input devices 215, 216, and 217 may be implemented on the display 201 in another type such as a soft key.

The indicator 206 may be disposed, for instance, on the first surface 210A of the housing 210. The indicator 206 may provide, for instance, information about a state of the electronic device 200 in a beam form, and include an LED.

The connector holes 208 and 209 may include a first connector hole 208 that can hold a connector (e.g., a USB connector) for transmitting/receiving power and/or data to/from an external electronic device, and/or a second connector hole (or an earphone jack) 209 that can hold a connector for transmitting/receiving an audio signal to/from the external electronic device.

Figure 2C:
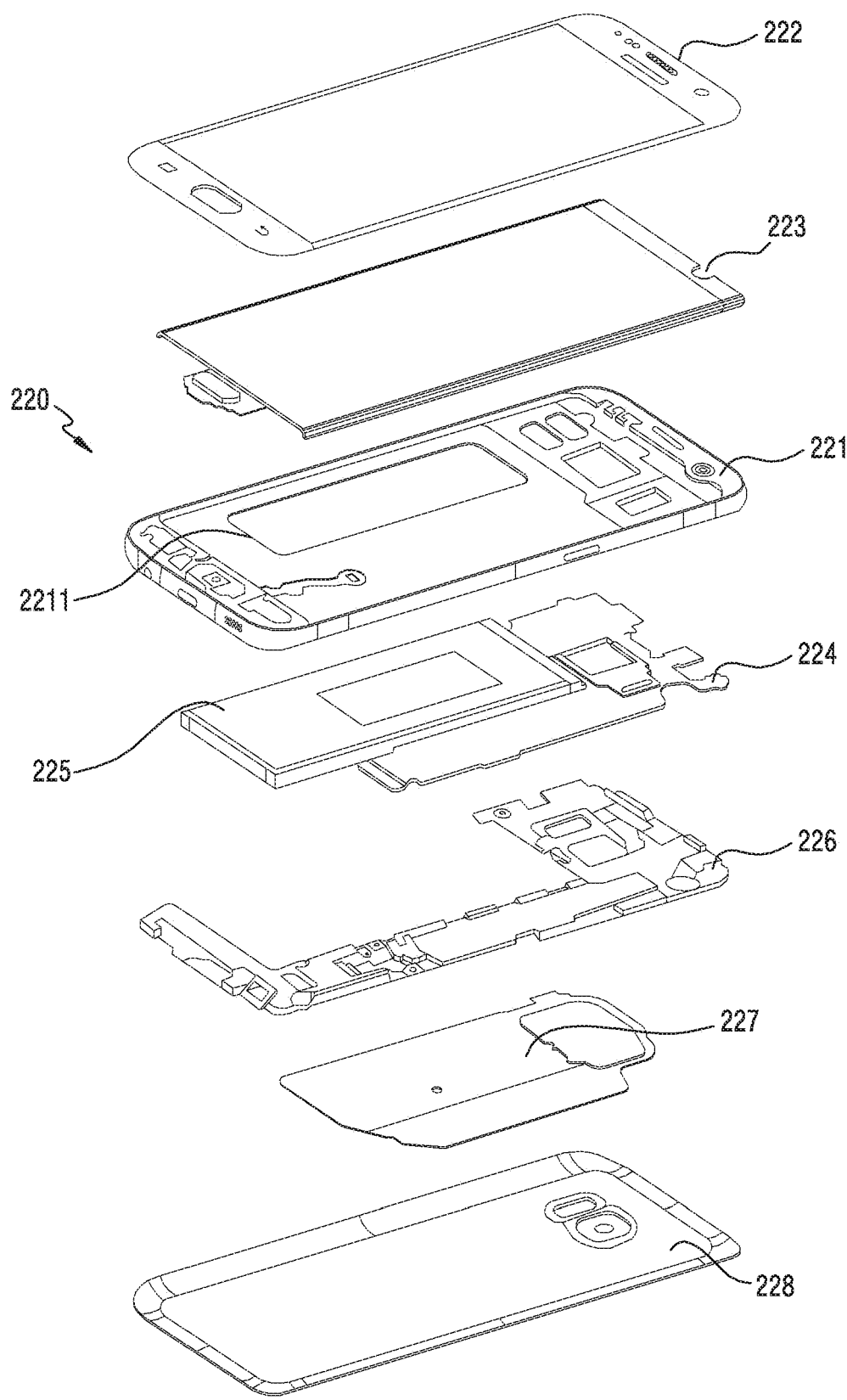
FIG. 2C is an exploded perspective view of an electronic device according to various embodiments of the disclosure.

FIG. 2C is an exploded perspective view of an electronic device according to various embodiments of the disclosure.

The electronic device 220 of FIG. 2C may include a lateral bezel structure 221, a first support member 2211 (e.g., a bracket), a front plate 222, a display 223, a printed circuit board 224, a battery 225, a second support member 226 (e.g., a rear case), an antenna 227, and a rear plate 228. In any embodiment, the electronic device 220 may omit at least one (e.g., the first support member 2211 or the second support member 226) of the constituent elements, or additionally include another constituent element. At least one of the constituent elements of the electronic device 220 may be identical or similar to at least one of the constituent elements of the electronic device 200 of FIG. 2A or 2B, and a duplicate description thereof will be omitted below.

The first support member 2211 may be disposed inside the electronic device 220 and be connected with the lateral bezel structure 221, or be formed integrally with the lateral bezel structure 221. The first support member 2211 may be formed of, for instance, a metallic material and/or a non-metallic material (e.g., a polymer material). The first support member 2211 may be joined with the display 223 on one surface thereof, and the printed circuit board 224 on the other surface thereof. A processor, a memory, and/or an interface may be mounted on the printed circuit board 224. The processor may include, for instance, one or more of a central processing unit, an application processor, a graphic processing unit, an image signal processor, a sensor hub processor, or a communication processor.

The memory may include, for instance, a volatile memory or a non-volatile memory.

The Interface may include, for instance, a high definition multimedia interface (HDMI), a universal serial bus (USB)

interface, an SD card interface, and/or an audio interface. For example, the interface may electrically or physically connect the electronic device 220 with an external electronic device, and include a USB connector, an SD card/MMC connector, or an audio connector.

The battery 225 is a unit for supplying power to at least one constituent element of the electronic device 220, and may include a non-rechargeable (primary) battery, a rechargeable (secondary) battery, or a fuel cell. For example, at least a part of the battery 225 may be disposed in substantially the same plane as the printed circuit board 224. The battery 225 may be integrally disposed inside the electronic device 220, or be disposed to be detachable from the electronic device 220.

The antenna 227 may be disposed between the rear plate 228 and the battery 225. The antenna 227 may include, for instance, a near field communication (NFC) antenna, a wireless charging antenna, and/or a magnetic secure transmission (MST) antenna. For example, the antenna 227 may perform near field communication with an external device, or may wirelessly transmit/receive power required for charging. In another embodiment, an antenna structure may be obtained by some of the lateral bezel structure 221 and/or the first support member 2211, or a combination thereof.

Figure 3A:
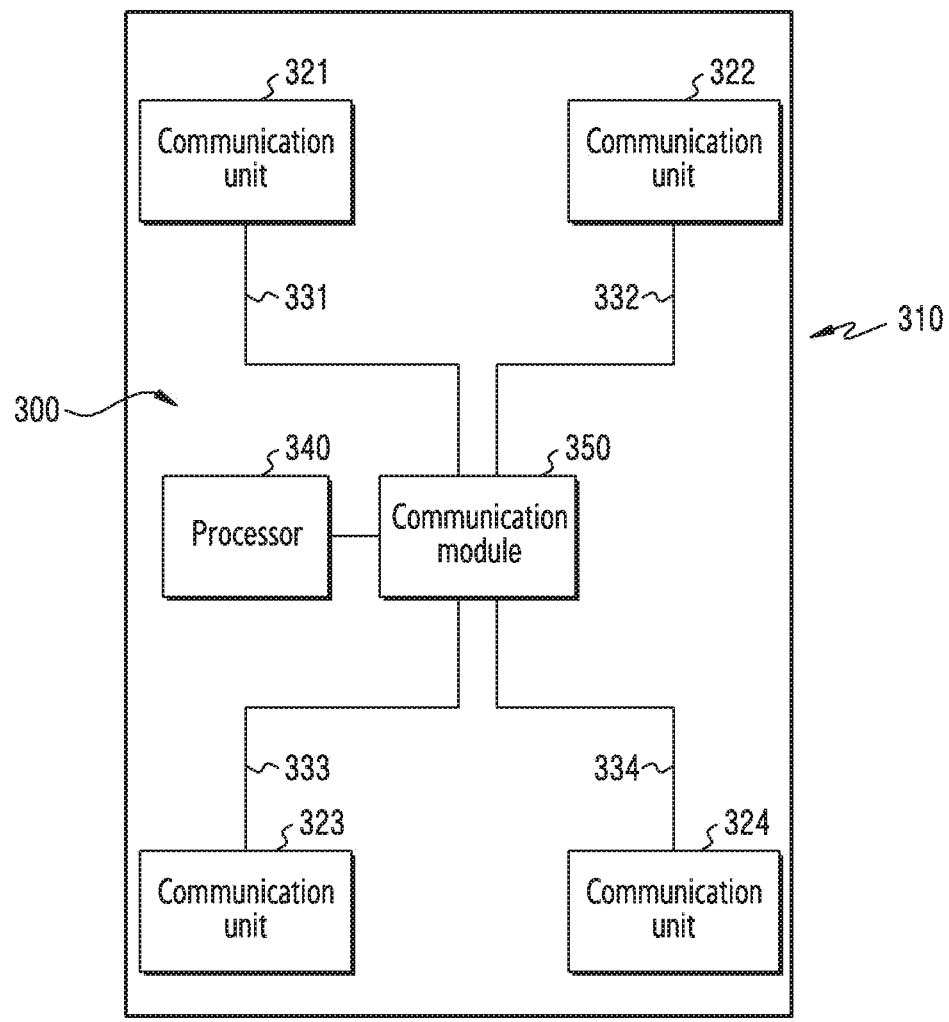
FIG. 3A is a view illustrating an example of an electronic device supporting 5G communication according to various embodiments of the disclosure.

FIG. 3A is a view illustrating an example of an electronic device supporting 5G communication.

Referring to FIG. 3A, an electronic device 300 may include a housing 310, a processor 340, a communication module 350 (e.g., the communication module 190 of FIG. 1), a first communication unit 321, a second communication unit 322, a third communication unit 323, a fourth communication unit 324, a first conductive line 331, a second conductive line 332, a third conductive line 333, or a fourth conductive line 334.

According to an embodiment, the housing 310 may protect the other constituent elements of the electronic device 300. The housing 310 may include, for instance, a front plate, a rear plate (a back plate) that faces away from the front plate, and a lateral member (or a metal frame) that is attached to the rear plate or is formed integrally with the rear plate, and surrounds a space between the front plate and the rear plate.

According to an embodiment, the electronic device 300 may include a first communication unit 321, a second communication unit 322, a third communication unit 323, or a fourth communication unit 324.

According to an embodiment, the first communication unit 321, the second communication unit 322, the third communication unit 323, or the fourth communication unit 324 may be located inside the housing 310. According to an embodiment, when viewed from above the rear plate of the electronic device, the first communication unit 321 may be disposed at a left upper end of the electronic device 300, the second communication unit 322 may be disposed at a right upper end of the electronic device 300, the third communication unit 323 may be disposed at a left lower end of the electronic device 300, and the fourth communication unit 324 may be disposed at a right lower end of the electronic device 300.

According to an embodiment, the processor 340 may include one or more of a central processing unit, an application processor, a graphic processing unit (GPU), an image signal processor of a camera, or a baseband processor (or a communication processor (CP)). According to an embodiment, the processor 340 may be implemented by a system-on-chip (SoC) or a system-in-package (SiP).

According to an embodiment, the communication module 350 may be electrically connected with the first communication unit 321, the second communication unit 322, the third communication unit 323, or the fourth communication unit 324 using the first conductive line 331, the second conductive line 332, the third conductive line 333, or the fourth conductive line 334. The communication module 350 may include, for instance, a baseband processor, or at least one communication circuit (e.g., an IFIC or an RFIC). The communication module 350 may include, for instance, a baseband processor independent of the processor 340 (e.g., the application processor (AP)). The first conductive line 331, the second conductive line 332, the third conductive line 333, or the fourth conductive line 334 may include, for instance, a coaxial cable or an FPCB.

According to an embodiment, the communication module 350 may include a first baseband processor (BP) (not illustrated) or a second BP (not illustrated). The electronic device 300 may further include one or more interfaces for supporting inter-chip communication between the first BP (or the second BP) and the processor 340. The processor 340 and the first BP or second BP may transmit/receive data using the inter-chip interface (an inter-processor communication channel).

According to an embodiment, the first BP or the second BP may provide an interface for performing communication with other individual entities. For example, the first BP may support wireless communication for a first network (not illustrated). For example, the second BP may support wireless communication for a second network (not illustrated).

According to an embodiment, the first BP or the second BP may form one module along with the processor 340. As an example, the first BP or the second BP may be formed integrally with the processor 340. As another example, the first BP or the second BP may be disposed in one chip or be formed in an independent chip type. According to an embodiment, the processor 340 and at least one BP (e.g., the first BP) may be integrally formed in one chip (SoC), and the other BP (e.g., the second BP) may be formed in an independent chip type.

According to an embodiment, the first network (not illustrated) or the second network (not illustrated) may correspond to the network 199 of FIG. 1. According to an embodiment, the first network (not illustrated) and the second network (not illustrated) may include a 4th generation (4G) network and a 5th generation (5G) network, respectively. The 4G network may support, for instance, the long-term evolution (LTE) protocol regulated in 3GPP. The 5G network may support, for instance, the new radio (NR) protocol regulated in 3GPP.

Figure 3B:
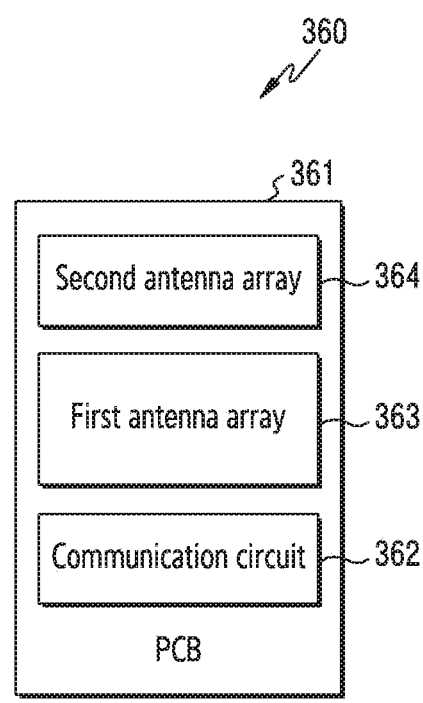
FIG. 3B is a block diagram of a communication unit according to various embodiments of the disclosure.

FIG. 3B is a block diagram of a communication unit according to an embodiment.

Referring to FIG. 3B, a communication unit 360 (e.g., the first communication unit 321, the second communication unit 322, the third communication unit 323, or the fourth communication unit 324 of FIG. 3A) may include a communication circuit 362 (e.g., an RFIC), a printed circuit board (PCB) 361, a first antenna array 363, or a second antenna array 364.

According to an embodiment, the communication circuit 362, the first antenna array 363, or the second antenna array 364 may be located on the PCB 361. For example, the first antenna array 363 or the second antenna array 364 may be disposed on a first surface of the PCB 361, and the communication circuit 362 may be located on a second surface of the PCB 361. The PCB 361 may include a connector (e.g., a coaxial cable connector or a board-to-board (B-to-B)) for electrical connection with another PCB (e.g., a PCB on which the communication module 350 of FIG. 3A is disposed) using a transmission line (e.g., the first conductive line 331 of FIG. 3A or a coaxial cable). For example, the PCB 361 may be connected with the PCB on which the communication module 350 is disposed via a coaxial cable using a coaxial cable connector, and the coaxial cable may be used to transmit transmitting and receiving IF or RF signals. As another example, power or other control signals may be transmitted through a B-to-B connector.

According to an embodiment, the first antenna array 363 or the second antenna array 364 may include a plurality of antenna elements. The antenna elements may include patch antennas, loop antennas, or dipole antennas. As an example, the antenna element included in the first antenna array 363 may be a patch antenna to produce a beam toward the rear plate of the electronic device 360. As another example, the antenna element included in the second antenna array 364 may be a dipole antenna or a loop antenna to produce a beam toward the lateral member of the electronic device (e.g., the electronic device 200 of FIG. 2A).

According to an embodiment, the communication circuit 362 may support at least some (e.g., about 24 to 30 GHz, or about 37 to 40 GHz) of about 3 to 100 GHz bands. According to an embodiment, the communication circuit 362 may perform frequency up- or down-conversion. As an example, the communication circuit 362 included in the communication unit 360 (e.g., the first communication unit 321 of FIG. 3A) may up-convert an IF signal, which is received from the communication module (e.g., the communication module 350 of FIG. 3A) through the conductive line (e.g., the first conductive line 331 of FIG. 3A), into an RF signal. As another example, the communication circuit 362 included in the communication unit 360 (e.g., the first communication unit 321 of FIG. 3A) may down-convert an RF signal (e.g., a millimeter wave signal) received through the first antenna array 363 or the second antenna array 364 into an IF signal, and transmit the IF signal to the communication module using the conductive line.

Figure 4A:
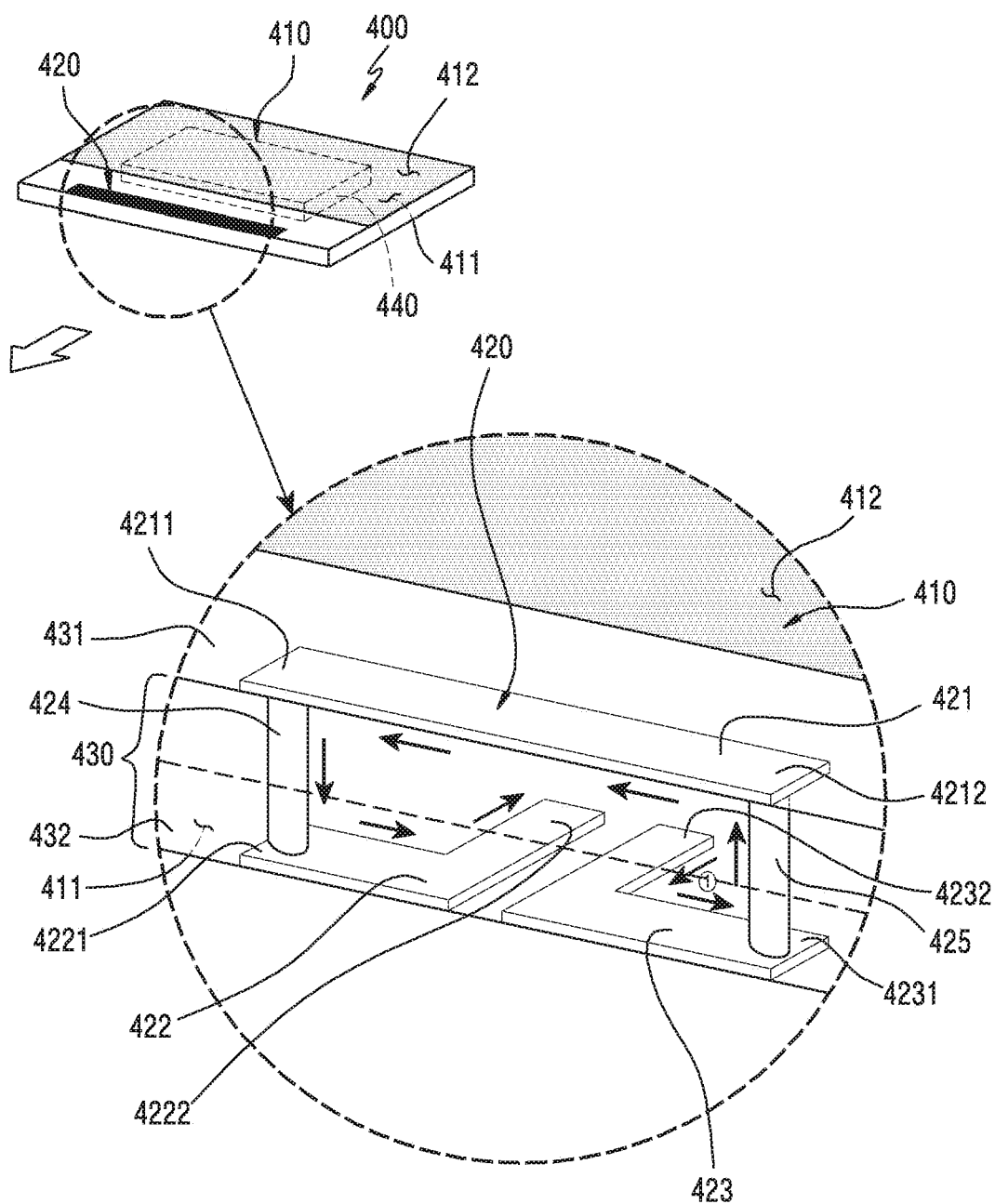
FIG. 4A is a perspective view of a communication unit according to various embodiments of the disclosure.
Figure 4B:
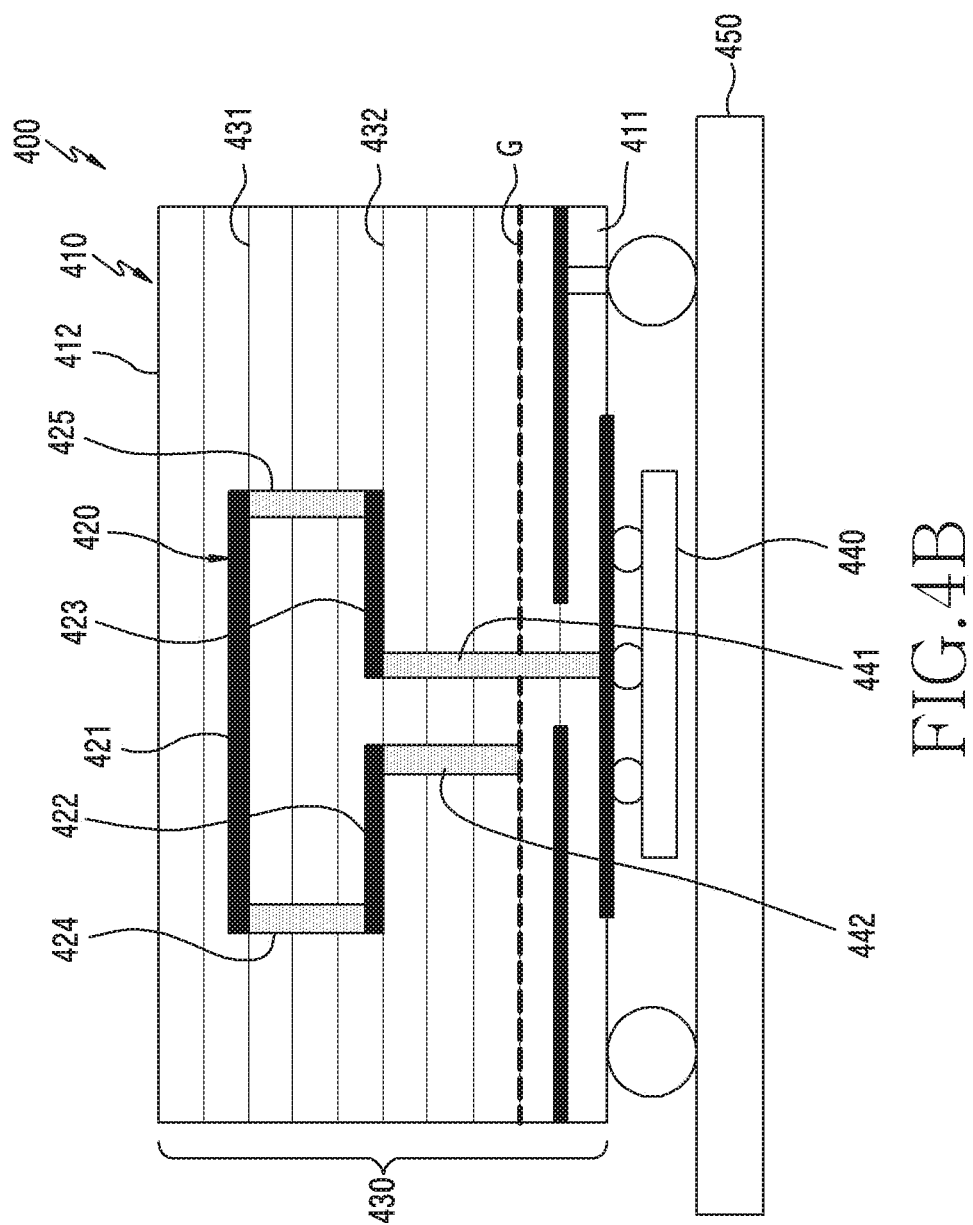
FIG. 4B is a sectional view illustrating a stacked structure of the communication unit of FIG. 4A according to various embodiments of the disclosure.

FIG. 4A is a perspective view of a communication unit according to various embodiments of the disclosure. FIG. 4B is a sectional view illustrating a stacked structure of the communication unit of FIG. 4A according to various embodiments of the disclosure.

The communication unit 400 of FIG. 4A may be at least partly similar to the communication unit 310, 320, 330, or 340 of FIG. 3A, or include other embodiments of the communication unit.

Referring to FIGS. 4A and 4B, the communication unit 400 may include an antenna structure. According to an embodiment, the antenna structure may include a board 410 and a loop antenna 420 that is disposed in a partial region of the board 410. According to an embodiment, the communication unit 400 may include a board 410. According to an embodiment, the board 410 may include a first surface 411 and a second surface 412 that faces away from the first surface 411. According to an embodiment, the board 410 may be disposed such that the second surface 412 thereof faces the rear plate (e.g., the rear plate 211 of FIG. 2B) of the electronic device (e.g., the electronic device 200 of FIG. 2B). Without being limited thereto, the board 410 may be disposed such that the second surface 412 thereof faces the lateral member (e.g., the lateral member 216 of FIG. 2A) or the front plate (e.g., the front plate 202 of FIG. 2A) of the electronic device. According to an embodiment, the board 410 may include a loop antenna 420 that is substantially disposed in an edge region of the board 410. According to an embodiment, the loop antenna 420 may include a first conductive pattern 421, a second conductive pattern 422, or a third conductive pattern 423 that are electrically connected to one another. According to an embodiment, the communication unit 400 may include a wireless communication circuit 440 that is disposed on the first surface 411 of the board 410. According to an embodiment, the wireless communication circuit 440 may be set to transmit/receive signals having frequencies of a range of about 3 GHz to 100 GHz. According to an embodiment, the board 410 may be mounted on the PCB (e.g., the PCB 350 of FIG. 3A) of the electronic device (e.g., the electronic device 300 of FIG. 3A) in a ball grid array (BGA) package type.

According to various embodiments, at least a part of the loop antenna 420 may be disposed on a plurality of insulating layers 430, inclusive of the first surface 411 and/or the second surface 412 of the board 410. Without being limited thereto, the loop antenna 420 may be disposed between the plurality of insulating layers 430 that form the board 410, rather than the first surface 411 and the second surface 412 of the board 410. According to an embodiment, a distance between at least some of the plurality of insulating layers 430 contributing to a thickness of the board 410 may be used as an electric length (e.g., a radiation path) for the loop antenna 420.

According to various embodiments, the loop antenna 420 may include a first conductive pattern 421 that is disposed on a first plane 431 of any one of the plurality of insulating layers 430, a second conductive pattern 422 that is disposed on a second plane 432 parallel to the first plane 431, and a third conductive pattern 423 that is spaced apart from the second conductive pattern 422 at a constant interval and is disposed on the second plane 432. According to an embodiment, the second conductive pattern 422 and the third conductive pattern 423 are disposed on the same plane (e.g., the second plane 432), but not limited thereto. For example, the second conductive pattern 422 and the third conductive pattern 423 may be disposed on different planes that are parallel to each other or are not parallel to each other. According to an embodiment, the second plane 432 is disposed parallel to the first plane 431, but it is not disposed on the same plane. According to an embodiment, one end 4211 of the first conductive pattern 421 may be electrically connected with one end 4221 of the second conductive pattern 422 through a first conductive via 424 that is formed in such a way as to pass through at least some of the plurality of insulating layers 430 in a longitudinal direction (e.g., a thickness direction of the board). According to an embodiment, the other end 4212 of the first conductive pattern 421 may be electrically connected with one end 4231 of the third conductive pattern 423 through a second conductive via 425 that is formed in such a way as to pass through at least some of the plurality of insulating layers 430 in a longitudinal direction. According to an embodiment, the other end 4222 of the second conductive pattern 422 may be electrically connected to a ground plane G of the board 410. As another example, the other end 4232 of the third conductive pattern 423 may be electrically connected to the wireless communication circuit 440 disposed on the first surface 411 of the board 410. According to an embodiment, the second conductive pattern 422 and the ground plane G may be electrically connected through a grounding via 442. As another example, the third conductive pattern 423 and the wireless communication circuit 440 may also be electrically connected through a power-supplying via 441.

According to various embodiments, the loop antenna 420 may be operated as a loop type antenna having a radiation path (e.g., a path ①) that is supplied with power from the other end 4232 of the third conductive pattern 423 and is connected to the ground plane G of the board 410 through the second conductive via 425, the first conductive pattern 421, the first conductive via 424, and the second conductive pattern 422. Without being limited thereto, the loop antenna 420 has a radiation path opposite to the above-mentioned radiation path even if a power-supplying position and a grounding position are exchanged with each other, and thereby the same radiation performance can be ensured. According to an embodiment, the loop antenna 420 may adjust a working frequency band and bandwidth according to a length and width of the first conductive pattern 421 and/or a length and width or interval of each of the second and third conductive patterns 422 and 423, and thus an electric length adjusted according to lengths of the conductive vias 424 and 425. According to an embodiment, since the loop antenna 420 may be substantially disposed in the edge region of the board 410 in the thickness direction of the board 410 using at least some of the plurality of insulating layers 430 of the board 410, radiation performance degradation of the antenna caused by the conductive elements disposed around the board 410 can be reduced. According to an embodiment, since the conductive vias 424 and 425 are disposed in the edge region of the board 410 and the distance between the plurality of insulating layers 430 contributing to the thickness of the board 410 is used as the electric length (e.g., the radiation path) for the loop antenna 420, lateral radiation performance can be improved.

According to various embodiments, since the conductive vias 424 and 425 are disposed in the edge region of the board 410 and the distance between at least some of the plurality of insulating layers 430 contributing to the thickness of the board 410 is used as the electric length (e.g., the radiation path) for the loop antenna 420, lateral radiation performance can be improved.

Figure 4C:
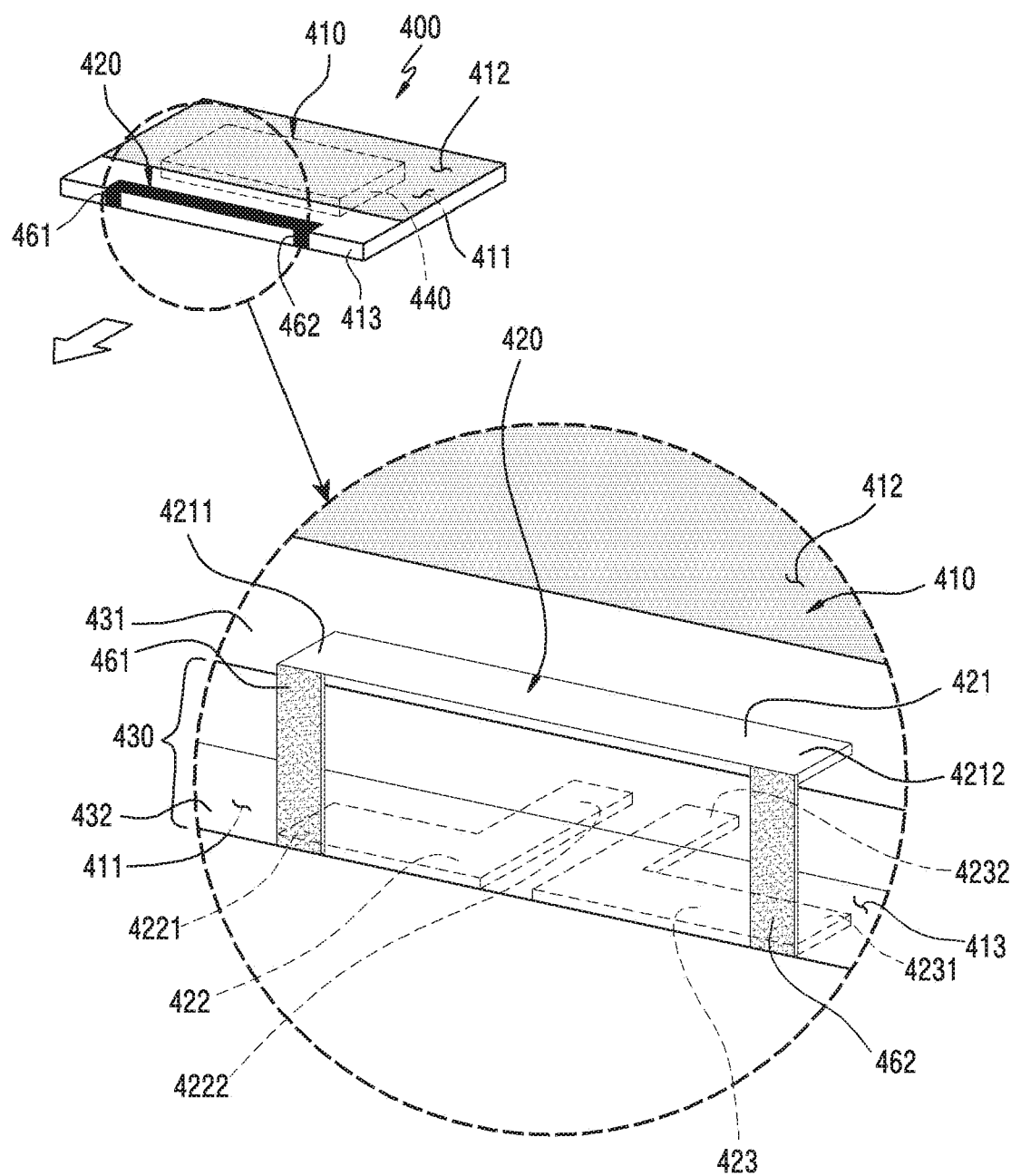
FIG. 4C is a perspective view of a communication unit according to various embodiments of the disclosure.

FIG. 4C is a perspective view of a communication unit according to various embodiments of the disclosure.

The communication unit 400 of FIG. 4C may have a configuration that is generally similar to that of the communication unit 400 of FIG. 4A, and only a connecting member for electrically connecting the first conductive pattern 421, the second conductive pattern 422, and the third conductive pattern 423 may be modified. The communication unit 400 according to the exemplary embodiment may have the same radiation path as the communication unit 400 of FIG. 4A.

Referring to FIG. 4C, the communication unit 400 may include an antenna structure. According to an embodiment, the antenna structure may include a board 410 and a loop antenna 420 that is disposed in a partial region of the board 410. According to an embodiment, the communication unit 400 may include a board 410. According to an embodiment, the board 410 may include a first surface 411, a second surface 412 that faces away from the first surface 411, and a lateral surface 413 that surrounds a space between the first surface 411 and the second surface 412. According to an embodiment, the board 410 may be disposed such that the second surface 412 thereof faces the rear plate (e.g., the rear plate 211 of FIG. 2B) of the electronic device (e.g., the electronic device 200 of FIG. 2B).

According to various embodiments, the board 410 may include a loop antenna 420 that is substantially disposed in an edge region of the board 410. According to an embodiment, the loop antenna 420 may include a first conductive pattern 421, a second conductive pattern 422, or a third conductive pattern 423 that are electrically connected to one another. According to an embodiment, the communication unit 400 may include a wireless communication circuit 440 that is disposed on the first surface 411 of the board 410. According to an embodiment, the board 410 may be mounted on the PCB (e.g., the PCB 350 of FIG. 3A) of the electronic device (e.g., the electronic device 300 of FIG. 3A) in a ball grid array (BGA) package type. According to an embodiment, the board 410 may include conductive lateral connecting members 461 and 462 that are disposed on the lateral surface 413 to electrically connect the first conductive pattern 421 and the second conductive pattern 422 and to electrically connect the first conductive pattern 421 and the third conductive pattern 423.

According to various embodiments, at least a part of the loop antenna 420 may be disposed on a plurality of insulating layers 430, inclusive of the first surface 411 and/or the second surface 412 of the board 410. Without being limited thereto, the loop antenna 420 may be disposed between the plurality of insulating layers 430 that form the board 410, rather than the first surface 411 and the second surface 412 of the board 410. According to an embodiment, a distance between at least some of the plurality of insulating layers 430 contributing to a thickness of the board 410 may be used as an electric length (e.g., a radiation path) for the loop antenna 420.

According to various embodiments, the loop antenna 420 may include a first conductive pattern 421 that is disposed on a first plane 431 of any one of the plurality of insulating layers 430, a second conductive pattern 422 that is disposed on a second plane 432 parallel to the first plane 431, and a third conductive pattern 423 that is spaced apart from the second conductive pattern 422 at a constant interval and is disposed on the second plane 432. According to an embodiment, the second conductive pattern 422 and the third conductive pattern 423 are disposed on the same plane (e.g., the second plane 432), but not limited thereto. For example, the second conductive pattern 422 and the third conductive pattern 423 may be disposed on different planes that are parallel to each other or are not parallel to each other. According to an embodiment, the second plane 432 is disposed parallel to the first plane 431, but it is not disposed on the same plane. According to an embodiment, one end 4211 of the first conductive pattern 421 may be electrically connected with one end 4221 of the second conductive pattern 422 through a first conductive lateral connecting member 461 disposed on the lateral surface 413 of the board 410. According to an embodiment, the other end 4212 of the first conductive pattern 421 may be electrically connected with one end 4231 of the third conductive pattern 423 through a second conductive lateral connecting member 462 disposed on the lateral surface 413 of the board 410. According to an embodiment, the other end 4222 of the second conductive pattern 422 may be electrically connected to a ground plane G of the board 410. As another example, the other end 4232 of the third conductive pattern 423 may be electrically connected to the wireless communication circuit 440 disposed on the first surface 411 of the board 410. According to an embodiment, the second conductive pattern 422 and the ground plane G may be electrically connected through a grounding via (e.g., the grounding via 442 of FIG. 4B). As another example, the third conductive pattern 423 and the wireless communication circuit 440 may also be electrically connected through a power-supplying via (e.g., the power-supplying via 441 of FIG. 4B).

According to various embodiments, the first conductive lateral connecting member 461 and the second conductive lateral connecting member 462 may include a plating member (e.g., a Cu plating) that is disposed on the lateral surface 413 of the board 410, or a conductive paint that is applied to the lateral surface of the board. According to an embodiment, if the conductive lateral connecting members 461 and 462 disposed on the lateral surface of the board are used instead of the conductive vias of FIG. 4A (e.g., the conductive vias 424 and 425 of FIG. 4A), the loop antenna 420 can be made closest to the board 410 in an edge direction of the board 410, and thus is relatively sufficiently isolated from the obstruction elements disposed on the board surface, so that radiation performance of the loop antenna 420 can be improved.

Figure 5A:
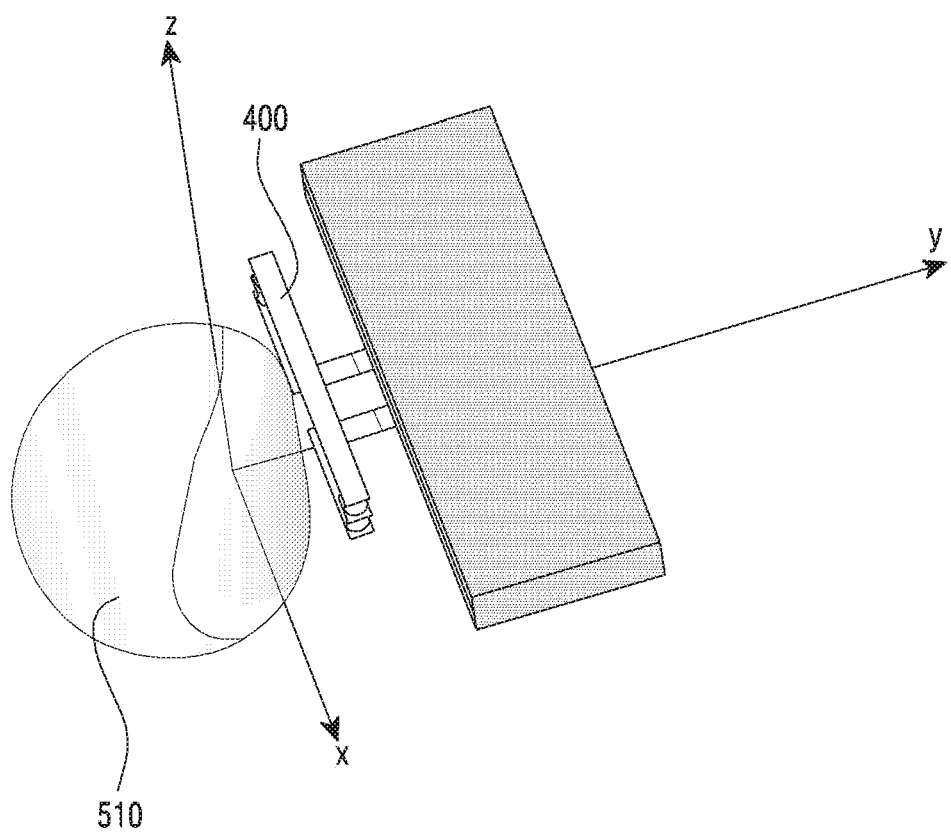
FIG. 5A is a view illustrating a radiation pattern of the communication unit of FIG. 4A according to various embodiments of the disclosure.

FIG. 5A is a view illustrating a radiation pattern 510 of the communication unit 400 of FIG. 4A according to various embodiments of the disclosure. It can be found that a beam pattern (an endfire) is produced in a lateral direction of the board by a loop antenna.

Figure 5B:
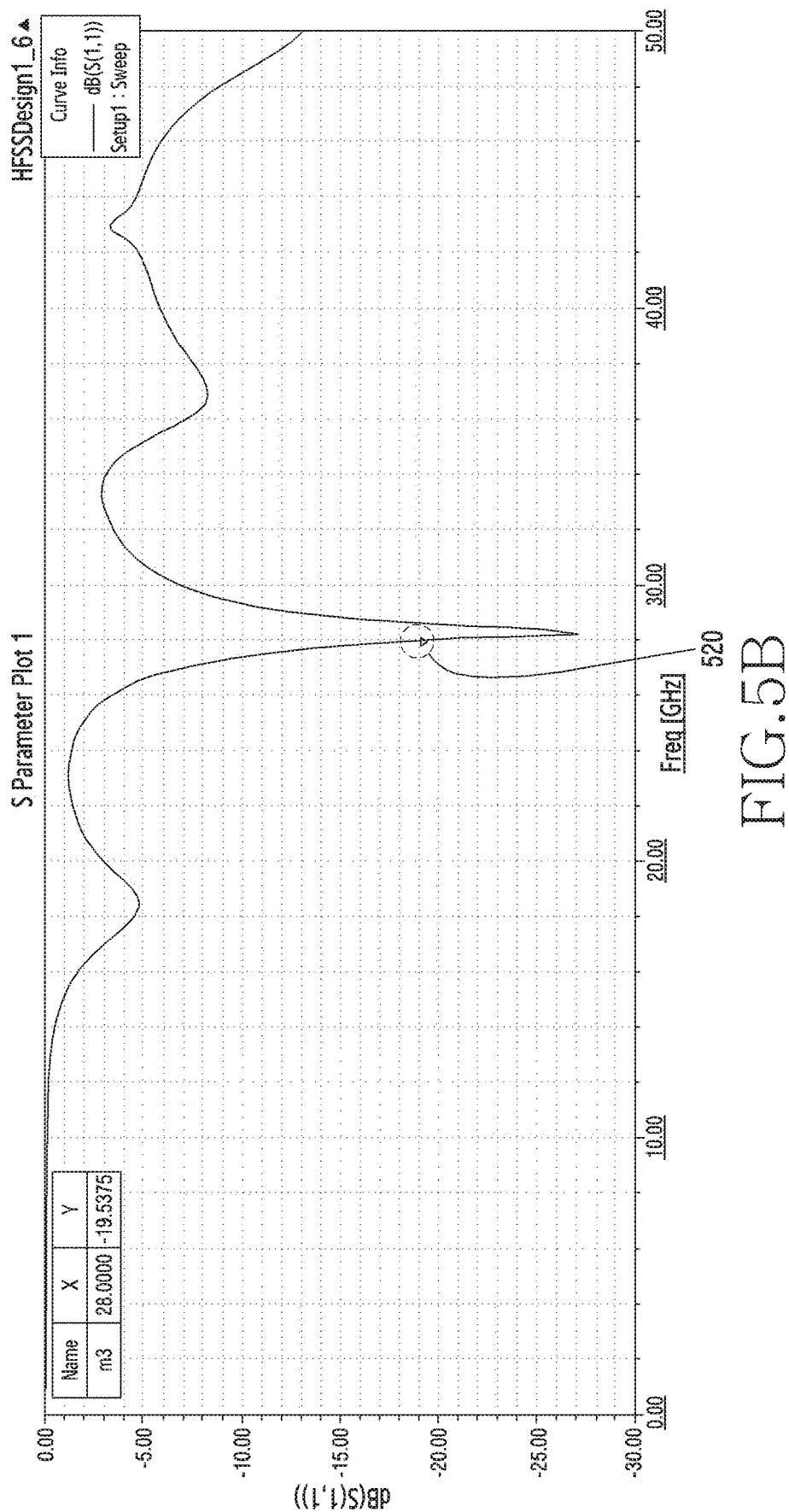
FIGS. 5B and 5C are graphs illustrating a reflection coefficient and gain of the communication unit of FIG. 4A according to various embodiments of the disclosure.
Figure 5C:
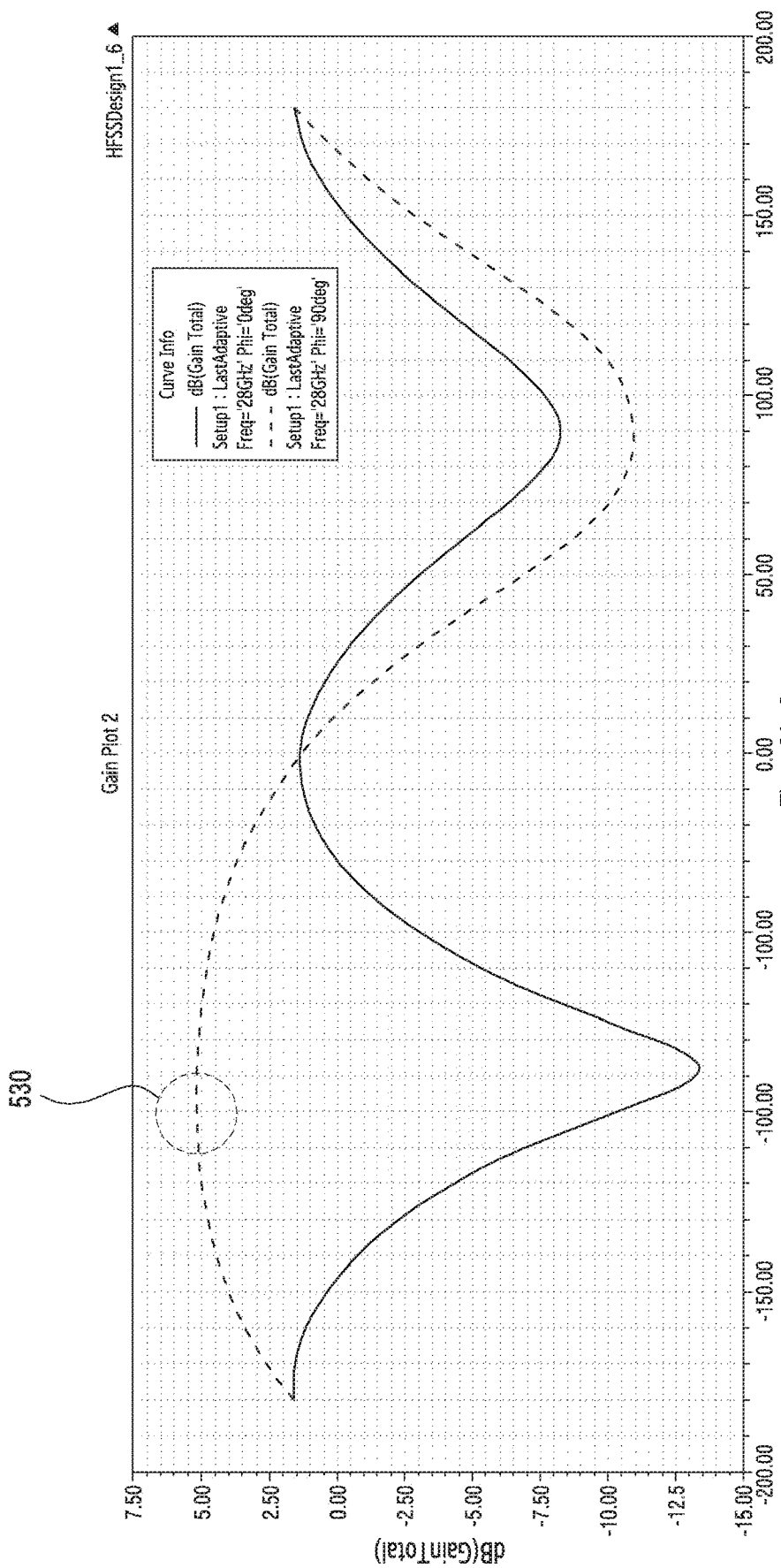

FIGS. 5B and 5C are graphs illustrating a reflection coefficient and gain of the communication unit 400 of FIG. 4A according to various embodiments of the disclosure. It can be found that the loop antenna shows resonance characteristics of −19 dB or higher at S11 (e.g., a region 520 of FIG. 5B), and shows a 5 dB gain higher than a result of a dipole antenna structure having the same board structure and physical property conditions by 2.5 dB (e.g., a region 530 of FIG. 5C).

Figure 6:
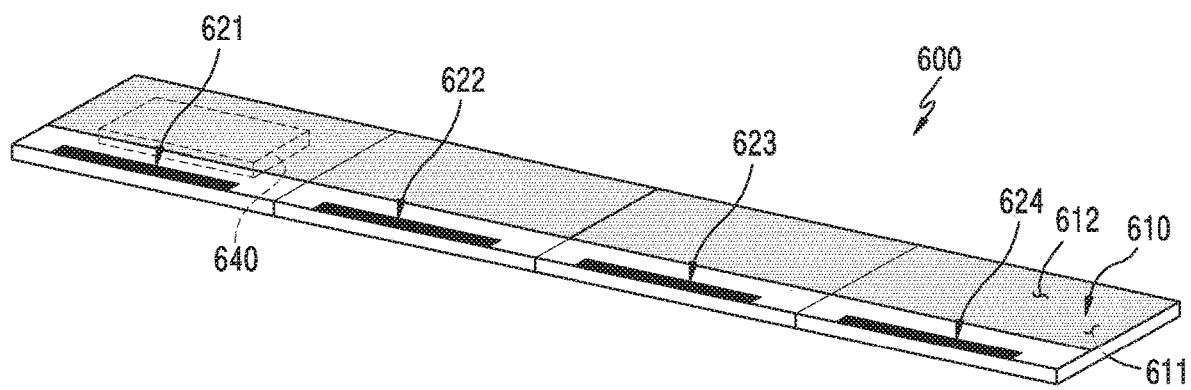
FIG. 6 is a perspective view of a communication unit according to various embodiments of the disclosure.

FIG. 6 is a perspective view of a communication unit according to various embodiments of the disclosure.

The communication unit 600 of FIG. 6 may be at least partly similar to the communication unit 310, 320, 330, or 340 of FIG. 3A, or include other embodiments of the communication units.

Referring to FIG. 6, the communication unit 600 may include a first surface 611 and a second surface 612 that faces away from the first surface 611. According to an embodiment, the communication unit 600 may include a wireless communication circuit 640 that is mounted on the first surface 611 of a board 610. According to an embodiment, the communication unit 600 may include a first loop antenna 621, a second loop antenna 622, a third loop antenna 623, or a fourth loop antenna 624 that are disposed antenna elements in a substantially edge region of the board 610 at fixed intervals, and the wireless communication circuit 640 that is electrically connected with the first loop antenna 621, the second loop antenna 622, the third loop antenna 623, or the fourth loop antenna 624. According to an embodiment, the communication unit 600 may be set to transmit/receive at least one signal having a frequency band of a range of about 3 GHz to 100 GHz through the wireless communication circuit 640 and an antenna array that includes the first loop antenna 621, the second loop antenna 622, the third loop antenna 623, or the fourth loop antenna 624.

According to various embodiments, the first loop antenna 621, the second loop antenna 622, the third loop antenna 623, or the fourth loop antenna 624 of the communication unit 600 may be formed through at least one conductive pattern (e.g., the first conductive pattern 421, the second conductive pattern 422, or the third conductive pattern 423 of FIG. 4A), and a conductive via (e.g., the first conductive via 424 or the second conductive via 425 of FIG. 4A) in a way that is at least partly similar to a configuration of the above-mentioned loop antenna of FIG. 4A (e.g., the loop antenna 420 of FIG. 4A).

Figure 7A:
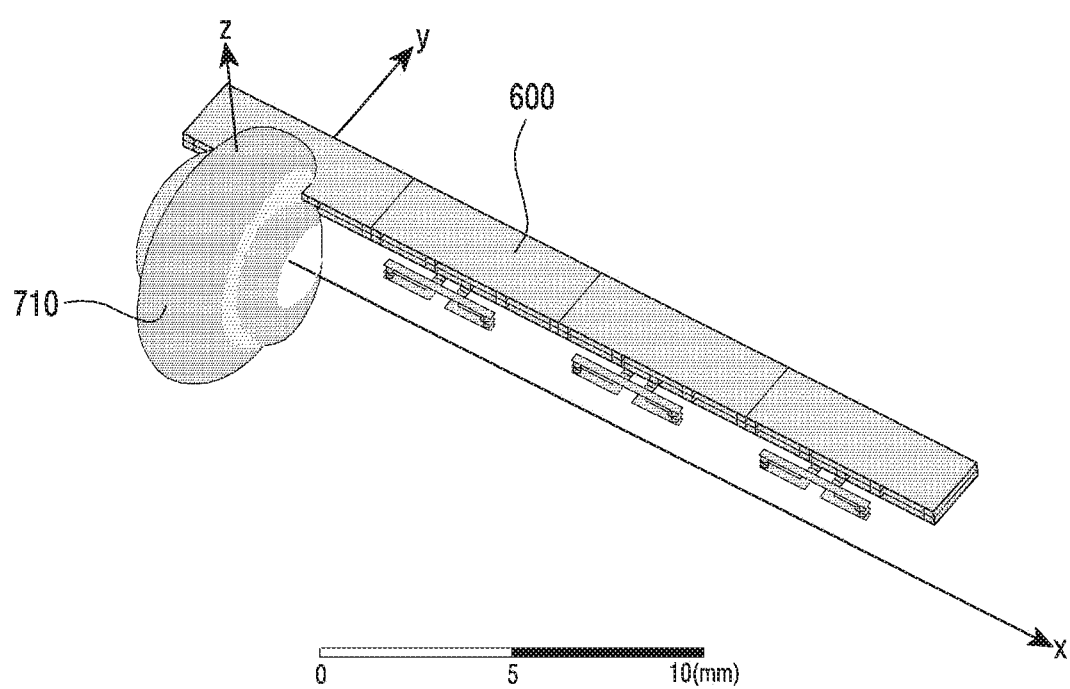
FIG. 7A is a view illustrating a radiation pattern of the communication unit of FIG. 6 according to various embodiments of the disclosure.

FIG. 7A is a view illustrating a radiation pattern 710 of the communication unit 600 of FIG. 6 according to various embodiments of the disclosure. It can be found that a bandwidth is relatively wider than an antenna array having the same board structure and physical property conditions.

Figure 7B:
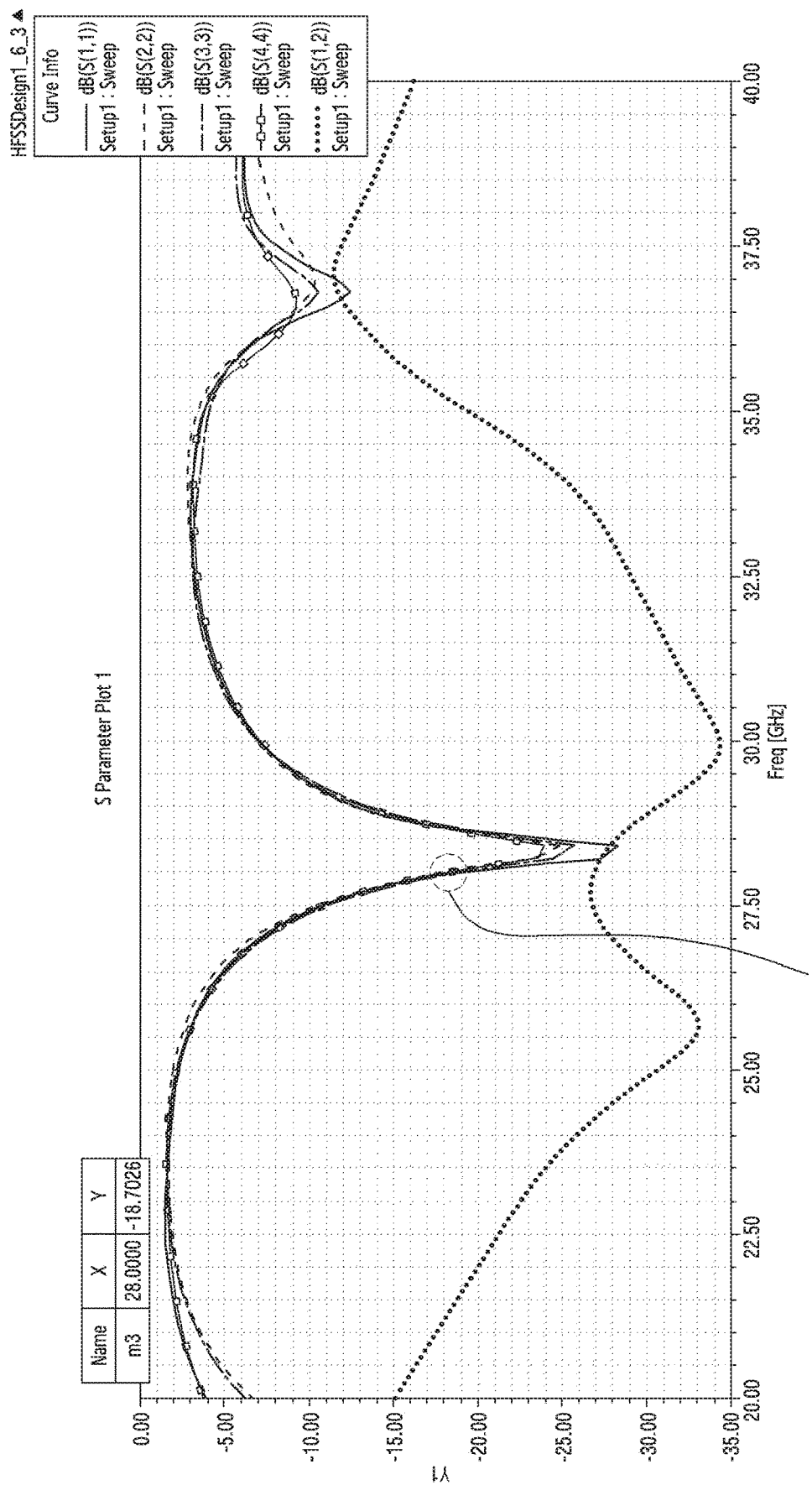
FIGS. 7B and 7C are graphs illustrating a reflection coefficient and gain of the communication unit of FIG. 6 according to various embodiments of the disclosure.
Figure 7C:
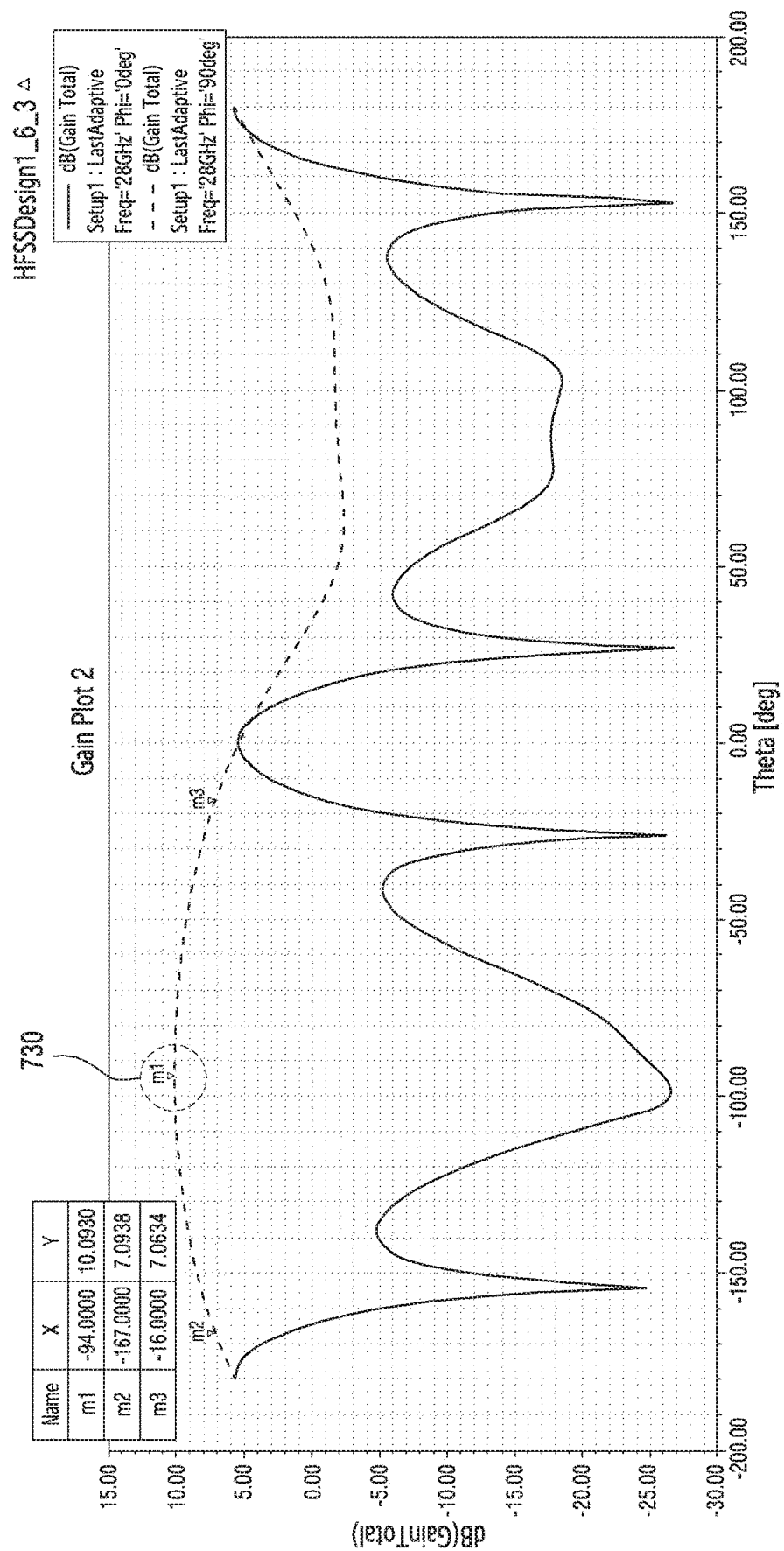

FIGS. 7B and 7C are graphs illustrating a reflection coefficient and gain of the communication unit 600 of FIG. 6 according to various embodiments of the disclosure.

As illustrated in FIG. 7B, it can be found that a loop antenna array shows resonance characteristics of −20 dB or higher at S11 (e.g., a region 720 of FIG. 7B).

FIG. 7C illustrates gain characteristics obtained by performing simulation on an elevation direction (theta) of the loop antenna array. It can be found that, in comparison with simulation results of a dipole array structure having the same board structure and physical property conditions, a peak gain increases 0.8 dB from 9.3 dB to 10.13 dB, and a 3-dB bandwidth increases 60° from 90° to 150° (e.g., a region 730 of FIG. 7C).

Figure 8A:
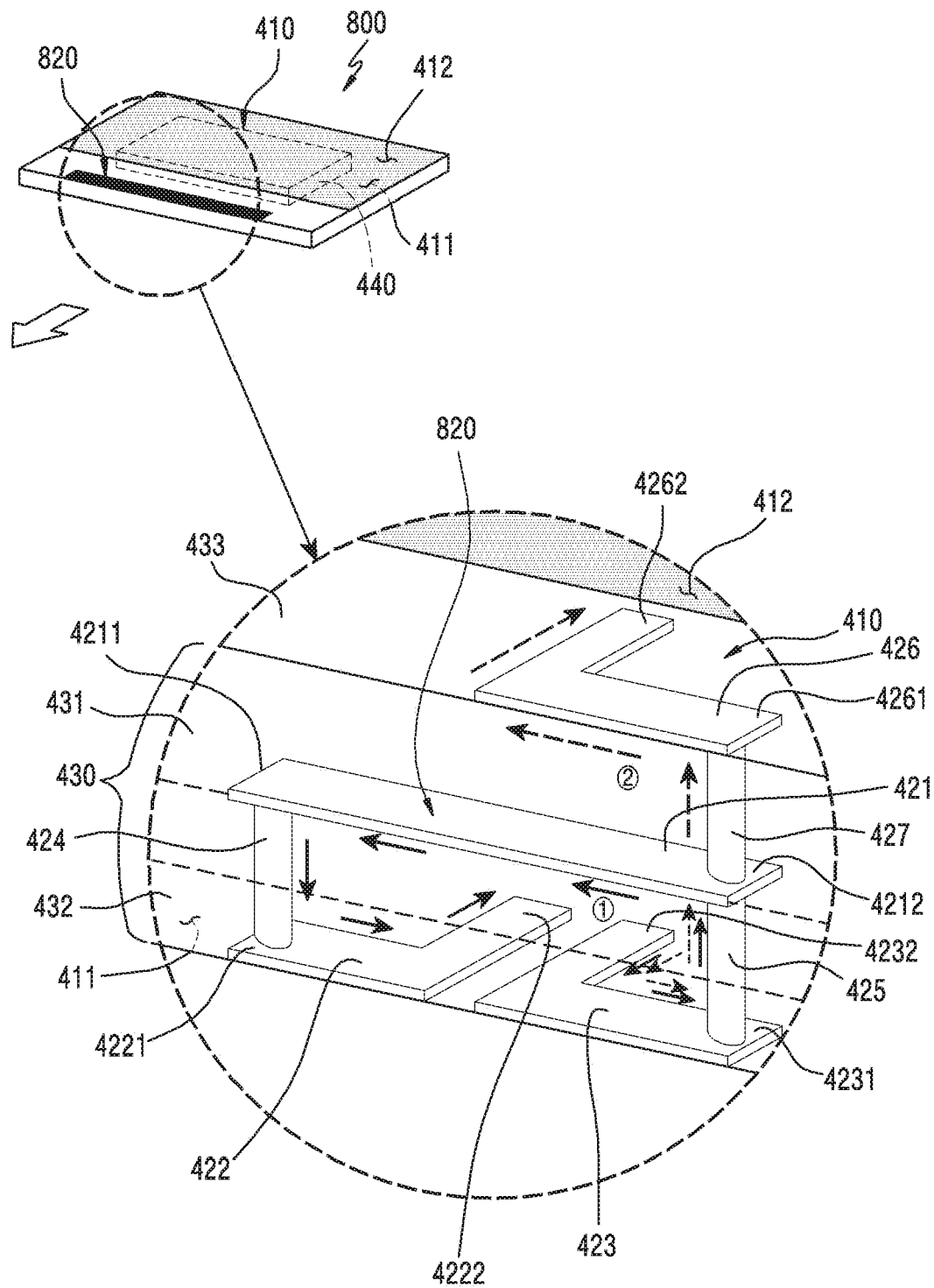
FIG. 8A is a perspective view of a communication unit according to various embodiments of the disclosure.
Figure 8B:
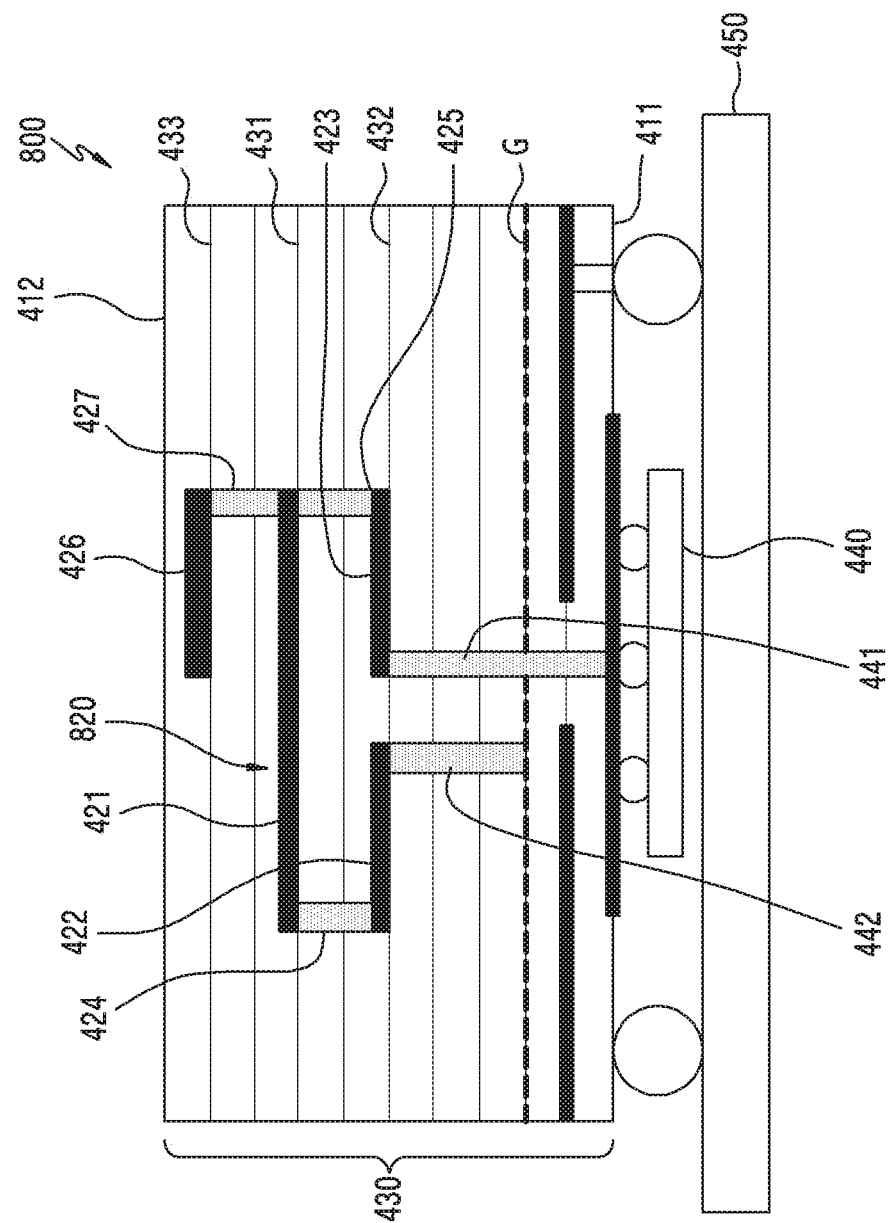
FIG. 8B is a sectional view illustrating a stacked structure of the communication unit of FIG. 8A according to various embodiments of the disclosure.

FIG. 8A is a perspective view of a communication unit according to various embodiments of the disclosure. FIG. 8B is a sectional view illustrating a stacked structure of the communication unit of FIG. 8A according to various embodiments of the disclosure.

The communication unit 800 of FIG. 8A may be at least partly similar to the communication units 310, 320, 330, and 340 of FIG. 3A, or include other embodiments of the communication units. In describing the communication unit 800 of FIGS. 8A and 8B, the same reference signs are used for constituent elements identical or similar to those of the communication unit 400 of FIGS. 4A and 4B.

Referring to FIGS. 8A and 8B, the communication unit 800 may include a board 410. According to an embodiment, the board 410 may include a first surface 411 and a second surface 412 that faces away from the first surface 411. According to an embodiment, the board 410 may include a loop antenna 820 that is substantially disposed in an edge region of the board 410. According to an embodiment, the loop antenna 820 may include a first conductive pattern 421, a second conductive pattern 422, a third conductive pattern 423, or a fourth conductive pattern 426 that are electrically connected to one another. According to an embodiment, the communication unit 400 may include a wireless communication circuit 440 that is disposed on the first surface 411 of the board 410. According to an embodiment, the wireless communication circuit 440 may be set to transmit/receive signals having frequencies of a range of about 3 GHz to 100 GHz.

According to various embodiments, at least a part of the loop antenna 820 may be disposed on a plurality of insulating layers 430, inclusive of the first surface 411 and/or the second surface 412 of the board 410. Without being limited thereto, the loop antenna 820 may be disposed between the plurality of insulating layers 430 that form the board 410, rather than the first surface 411 and the second surface 412 of the board 410. According to an embodiment, a distance between at least some of the plurality of insulating layers 430 included in the board 410 may be used as an electric length (e.g., a radiation path) for the loop antenna 820.

According to various embodiments, the loop antenna 820 may include a first conductive pattern 421 that is disposed on a first plane 431 of any one of the plurality of insulating layers 430, a second conductive pattern 422 that is disposed on a second plane 432 parallel to the first plane 431, a third conductive pattern 423 that is spaced apart from the second conductive pattern 422 at a constant interval and is disposed on the second plane 432, and a fourth conductive pattern 426 that is disposed on a third plane 433 parallel to the first plane 431. According to an embodiment, the second conductive pattern 422 and the third conductive pattern 423 are disposed on the same plane (e.g., the second plane 432), but not limited thereto. For example, the second conductive pattern 422 and the third conductive pattern 423 may be disposed on different planes that are parallel to each other or are not parallel to each other. According to an embodiment, the first plane 431, the second plane 432, and the third plane 433 are disposed parallel to one another, and are not disposed on the same plane. According to an embodiment, the first plane 431 may be disposed between the second plane 432 and the third plane 433.

According to various embodiments, one end 4211 of the first conductive pattern 421 may be electrically connected with one end 4221 of the second conductive pattern 422 through a first conductive via 424 that is formed in such a way as to pass through at least some of the plurality of insulating layers 430 in a longitudinal direction (a thickness direction of the board). According to an embodiment, the other end 4212 of the first conductive pattern 421 may be electrically connected with one end 4231 of the third conductive pattern 423 through a second conductive via 425 that is formed in such a way as to pass through at least some of the plurality of insulating layers 430 in a longitudinal direction. According to an embodiment, one end 4261 of the fourth conductive pattern 426 may be electrically connected to the other end 4212 of the first conductive pattern 421 through a third conductive via 427 that is formed in such a way as to pass through at least some of the plurality of insulating layers 430 in a longitudinal direction. According to an embodiment, the second conductive via 425 and the third conductive via 427 may be disposed to be aligned in a row in the longitudinal direction (the thickness direction) of the board 410. According to an embodiment, the other end 4222 of the second conductive pattern 422 and the other end 4262 of the fourth conductive pattern 426 may be electrically connected to a ground plane G of the board 410. As another example, the other end 4232 of the third conductive pattern 423 may be electrically connected to the wireless communication circuit 440 disposed on the first surface 411 of the board 410. According to an embodiment, the second conductive pattern 422, the fourth conductive pattern 426, and the ground plane G may be electrically connected through a grounding via 442. As another example, the third conductive pattern 423 and the wireless communication circuit 440 may also be electrically connected through a power-supplying via 441.

According to various embodiments, the loop antenna 820 may be operated as a dual-band antenna having working frequency bands different from each other. According to an embodiment, the loop antenna 820 may be operated as a loop type antenna having a first radiation path (e.g., a path ①) that is supplied with power from the other end 4232 of the third conductive pattern 423 and is connected to the ground plane G of the board 410 through the second conductive via 425, the first conductive pattern 421, the first conductive via 424, and the second conductive pattern 422. According to an embodiment, the loop antenna 820 may be operated as a loop type antenna having a second radiation path (e.g., a path ②) that is supplied with power from the other end 4232 of the third conductive pattern 423 and is connected to the ground plane G of the board 410 through the second conductive via 425, the third conductive via 427, and the fourth conductive pattern 426. According to an embodiment, the wireless communication circuit 440 may be set to transmit/receive a first signal having a first frequency using the first radiation path (the path ①), and to transmit/receive a second signal having a second frequency different from the first frequency using the second radiation path (the path ②). According to an embodiment, the first frequency may include a lower frequency band than the second frequency. According to an embodiment, the first frequency may include frequencies of a range of about 24 GHz to 32 GHz, and the second frequency may include frequencies of a range of about 34 GHz to 44 GHz.

According to various embodiments, the loop antenna 820 may adjust a working frequency band and bandwidth according to a length and width of the first conductive pattern 421 and/or a length and width or interval of each of the second and third conductive patterns 422 and 423, a length and width of the fourth conductive pattern 426, and thus an electric length adjusted according to lengths of the conductive vias 424, 425, and 427. According to an embodiment, since the loop antenna 820 may be substantially disposed in the edge region of the board 410 in the thickness direction of the board 410 using the plurality of insulating layers 430 of the board 410, radiation performance degradation of the antenna caused by the conductive elements disposed around the board 410 can be reduced.

According to various embodiments, since the conductive vias 424, 425, and 427 are disposed in the edge region of the board 410 and uses the distance between at least some of the plurality of insulating layers 430 utilized as a thickness is used as the electric length (e.g., the radiation path) for the loop antenna 820, lateral radiation performance can be improved.

Figure 8C:
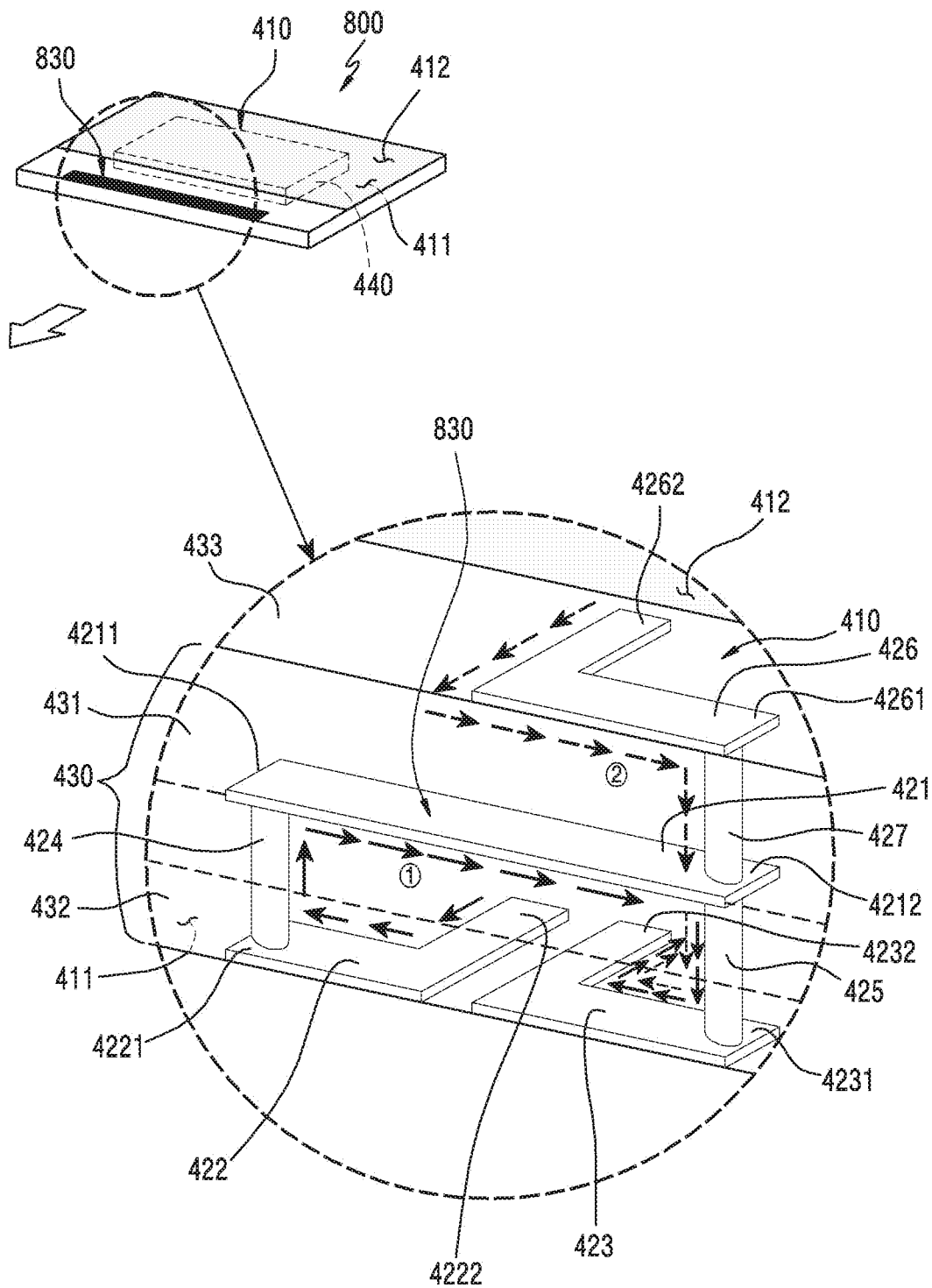
FIG. 8C is a perspective view of a communication unit according to various embodiments of the disclosure.

FIG. 8C is a perspective view of a communication unit according to various embodiments of the disclosure.

A loop antenna 830 of FIG. 8C may have the same structure as the loop antenna 820 of FIG. 8A, and be configured to have another radiation path by exchanging a power-supplying position and a grounding position.

According to various embodiments, the loop antenna 830 may be operated as a dual-band antenna having working frequency bands different from each other. According to an embodiment, the loop antenna 830 may be operated as a loop type antenna having a first radiation path (e.g., a path ①) that is supplied with power from the other end 4222 of the second conductive pattern 422 and is connected to the ground plane G of the board 410 through the first conductive via 424, the first conductive pattern 421, the second conductive via 425, and the third conductive pattern 423. According to an embodiment, the loop antenna 830 may be operated as a loop type antenna having a second radiation path (e.g., a path ②) that is supplied with power from the other end 4262 of the fourth conductive pattern 426 and is connected to the ground plane G of the board 410 through the third conductive via 427, the second conductive via 425, and the third conductive pattern 423. According to an embodiment, the wireless communication circuit 440 may be set to transmit/receive a first signal having a first frequency using the first radiation path (the path ①), and to transmit/receive a second signal having a second frequency different from the first frequency using the second radiation path (the path ②). According to an embodiment, the first frequency may include a lower frequency band than the second frequency. According to an embodiment, the first frequency may include frequencies of a range of about 24 GHz to 32 GHz, and the second frequency may include frequencies of a range of about 34 GHz to 44 GHz.

According to various embodiments, since the conductive vias 424, 425, and 427 are disposed in the edge region of the board 410 and uses the distance between at least some of the plurality of insulating layers 430 utilized as a thickness is used as the electric length (e.g., the radiation path) for the loop antenna 830, lateral radiation performance can be improved.

According to various embodiments, although not illustrated, the loop antennas 820 and 830 of FIGS. 8A and 8C may include the above-mentioned conductive lateral connecting members of FIG. 4C (e.g., the conductive lateral connecting members 461 and 462 of FIG. 4C) disposed on the lateral surface (e.g., the lateral surface 413 of FIG. 4C) of the board 410 instead of the conductive vias 424, 425, and 427.

Figure 9:
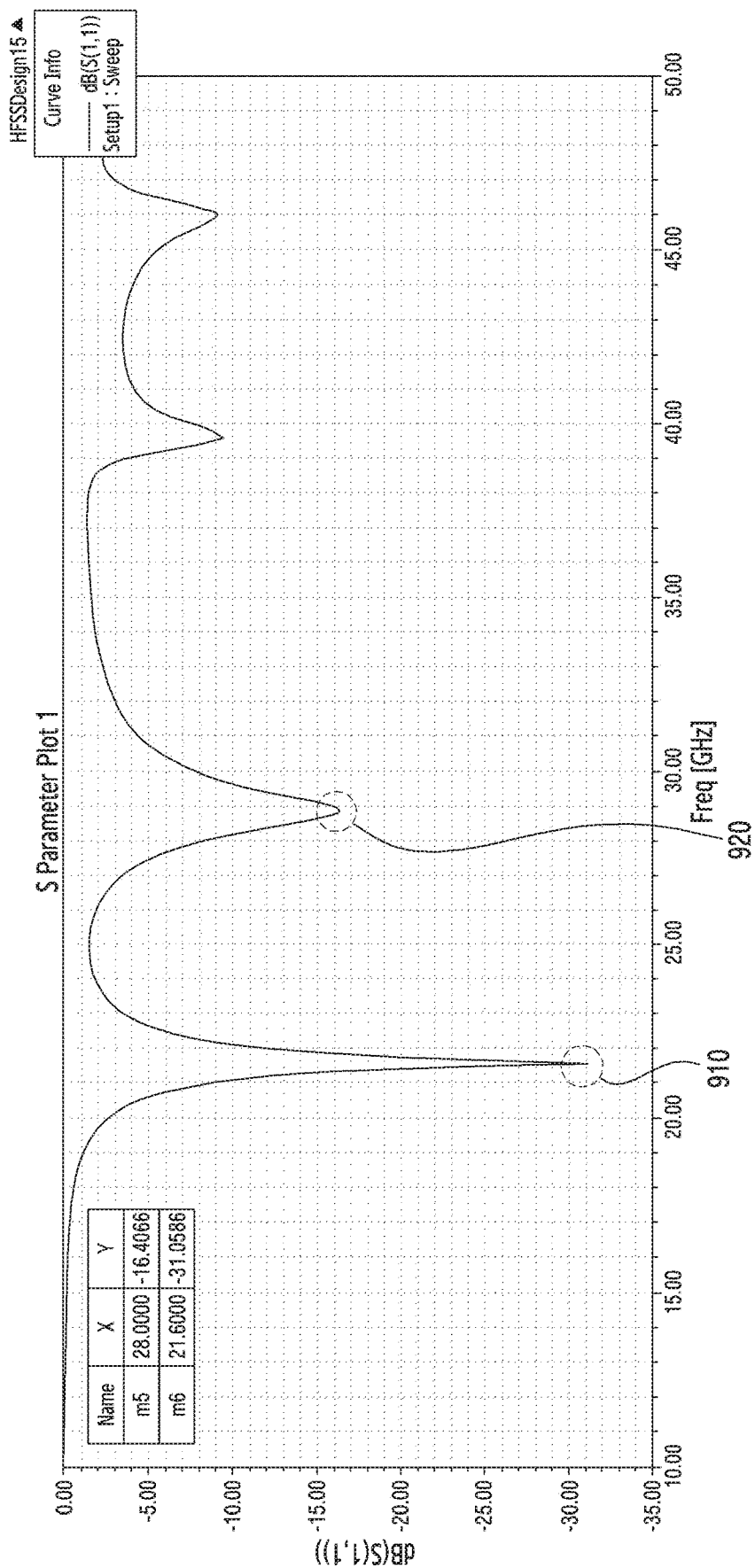
FIG. 9 is a graph illustrating a reflection coefficient of the communication unit of FIG. 4A according to various embodiments of the disclosure.

FIG. 9 is a graph illustrating a reflection coefficient of the communication unit 820 of FIG. 8A according to various embodiments of the disclosure. It can be found that a resonance point is formed at a first working frequency of about 21.6 GHz (e.g., a region 910 of FIG. 9), and a resonance point is formed at a second working frequency of about 28.8 GHz (e.g., a region 920 of FIG. 9).

Figure 10:
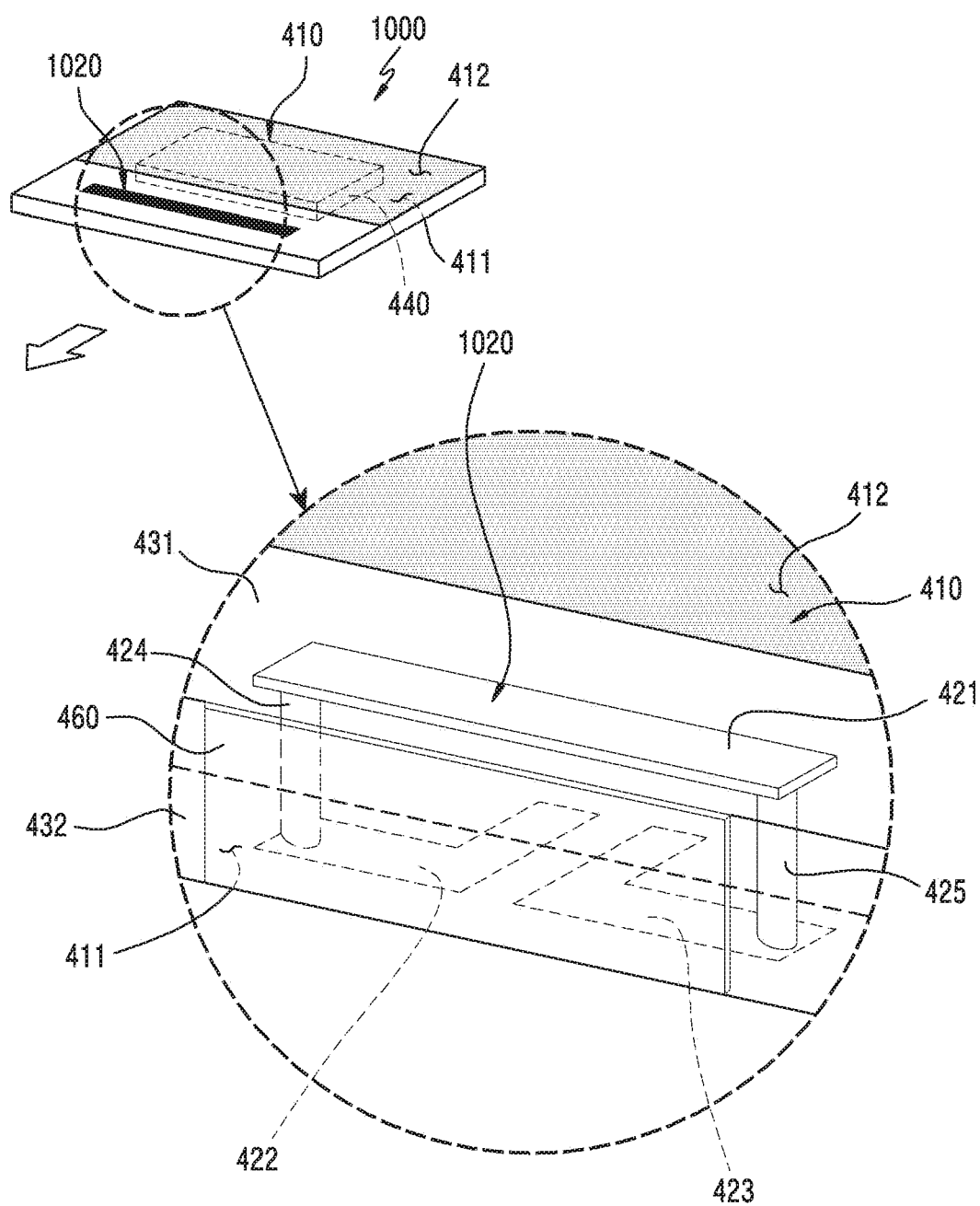
FIG. 10 is a perspective view of a communication unit according to various embodiments of the disclosure.

FIG. 10 is a perspective view of a communication unit according to various embodiments of the disclosure.

The communication unit 1000 of FIG. 10 may be at least partly similar to the communication units 310, 320, 330, and 340 of FIG. 3A, or include other embodiments of the communication units. In describing the communication unit 1000 of FIG. 10, the same reference signs are used for constituent elements identical or similar to those of the communication unit 400 of FIGS. 4A and 4B.

Referring to FIG. 10, the communication unit 1000 may include a board 410. According to an embodiment, the board 410 may include a first surface 411 and a second surface 412 that faces away from the first surface 411. According to an embodiment, the board 410 may include a loop antenna 1020. According to an embodiment, the loop antenna 1020 may include a first conductive pattern 421, a second conductive pattern 422, or a third conductive pattern 423 that are electrically connected to one another through a first conductive via 424 or a second conductive via 425. According to an embodiment, the communication unit 1000 may include a wireless communication circuit 440 that is disposed on a first surface 411 of the board 410. According to an embodiment, the wireless communication circuit 440 may be set to transmit/receive signals having frequencies of a range of about 3 GHz to 100 GHz.

According to various embodiments, the loop antenna 1020 may be operated as a loop type antenna having a radiation path (e.g., the radiation path (the path ①) of FIG. 4A) that is supplied with power from the third conductive pattern 423 and is connected to a ground plane G of the board 410 through the second conductive via 425, the first conductive pattern 421, the first conductive via 424, and the second conductive pattern 422.

According to various embodiments, the loop antenna 1020 may include a conductive director 460 that is disposed in such a way as to at least partly overlap the conductive patterns 421, 422, and 423 used as antenna elements in a direction in which a beam pattern is formed. In an embodiment, the conductive director 460 may be disposed at a position corresponding to a lateral surface that surrounds a space between the first surface 411 and the second surface 412 of the board 410. Without being limited thereto, the conductive director 460 may be disposed inside an electronic device (e.g., the electronic device 300 of FIG. 3A) in place so as to have a distance capable of reacting with the conductive patterns 421, 422, and 423. According to an embodiment, the conductive director 460 may be disposed in various surrounding structures such as a PCB (e.g., the PCB 350 of FIG. 3A) disposed inside the electronic device (e.g., the electronic device 300 of FIG. 3A) or a housing (e.g., the housing 210 of FIG. 2A). According to an embodiment, the conductive director 460 may include an EMI paint, a metal plate, or a FPCB that is disposed on an inner surface of the housing. According to an embodiment, the conductive director 460 may be insert-molded in the housing (e.g., the housing 210 of FIG. 2A). As another example, the conductive director 460 may be disposed in such a way as to be attached to the outside of the housing (e.g., the housing 210 of FIG. 2A). For example, the conductive director 460 may include a conductive decorating member that is disposed on an outer surface of the housing (e.g., the housing 210 of FIG. 2A). According to an embodiment, the conductive director 460 may be formed in a size above the longest length of lengths of the conductive patterns 421, 422, and 423, and may be disposed to maintain a proper distance from the conductive patterns according to the working frequency.

According to various embodiments, although not illustrated, the loop antenna 1020 of FIG. 10 may include the above-mentioned conductive lateral connecting members of FIG. 4C (e.g., the conductive lateral connecting members 461 and 462 of FIG. 4C) that are disposed on the lateral surface (e.g., the lateral surface 413 of FIG. 4C) of the board 410 instead of the conductive vias 424 and 425.

Figure 11A:
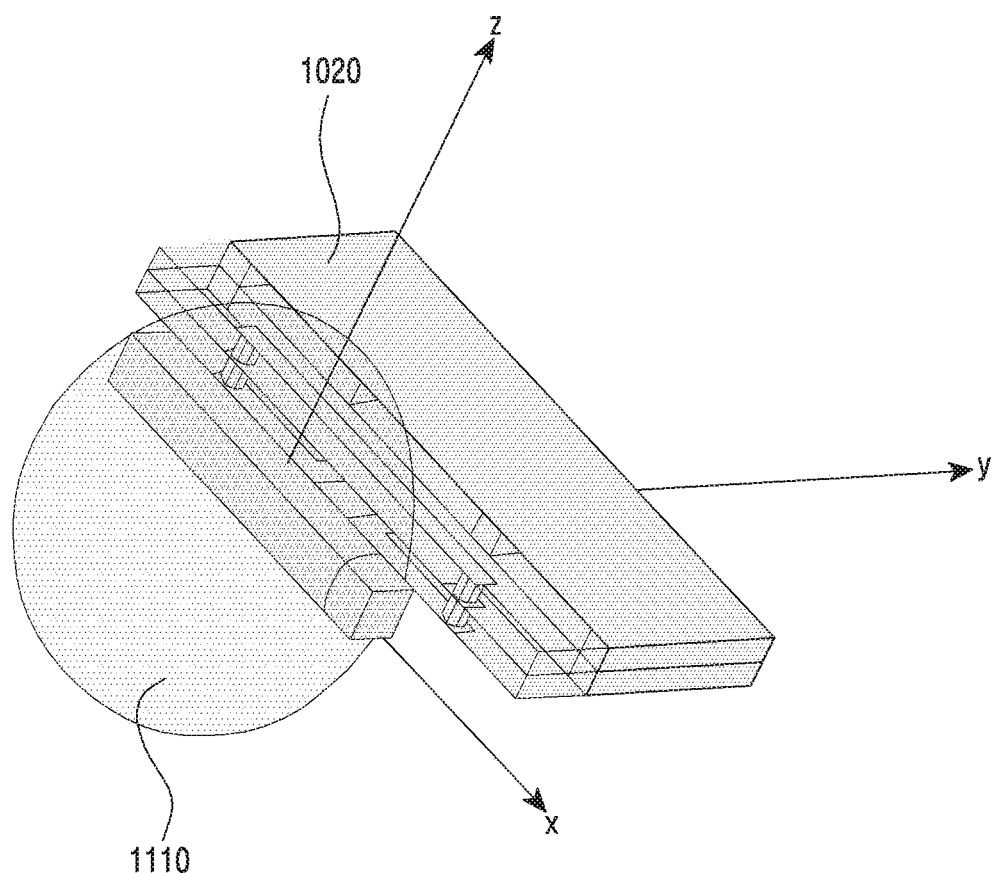
FIG. 11A is a view illustrating a radiation pattern of the communication unit of FIG. 10 according to various embodiments of the disclosure.

FIG. 11A is a view illustrating a radiation pattern 1110 of the communication unit 1020 of FIG. 10 according to various embodiments of the disclosure. It can be found that a greater gain and a shaper beam pattern are obtained in the loop antenna by the conductive director.

Figure 11B:
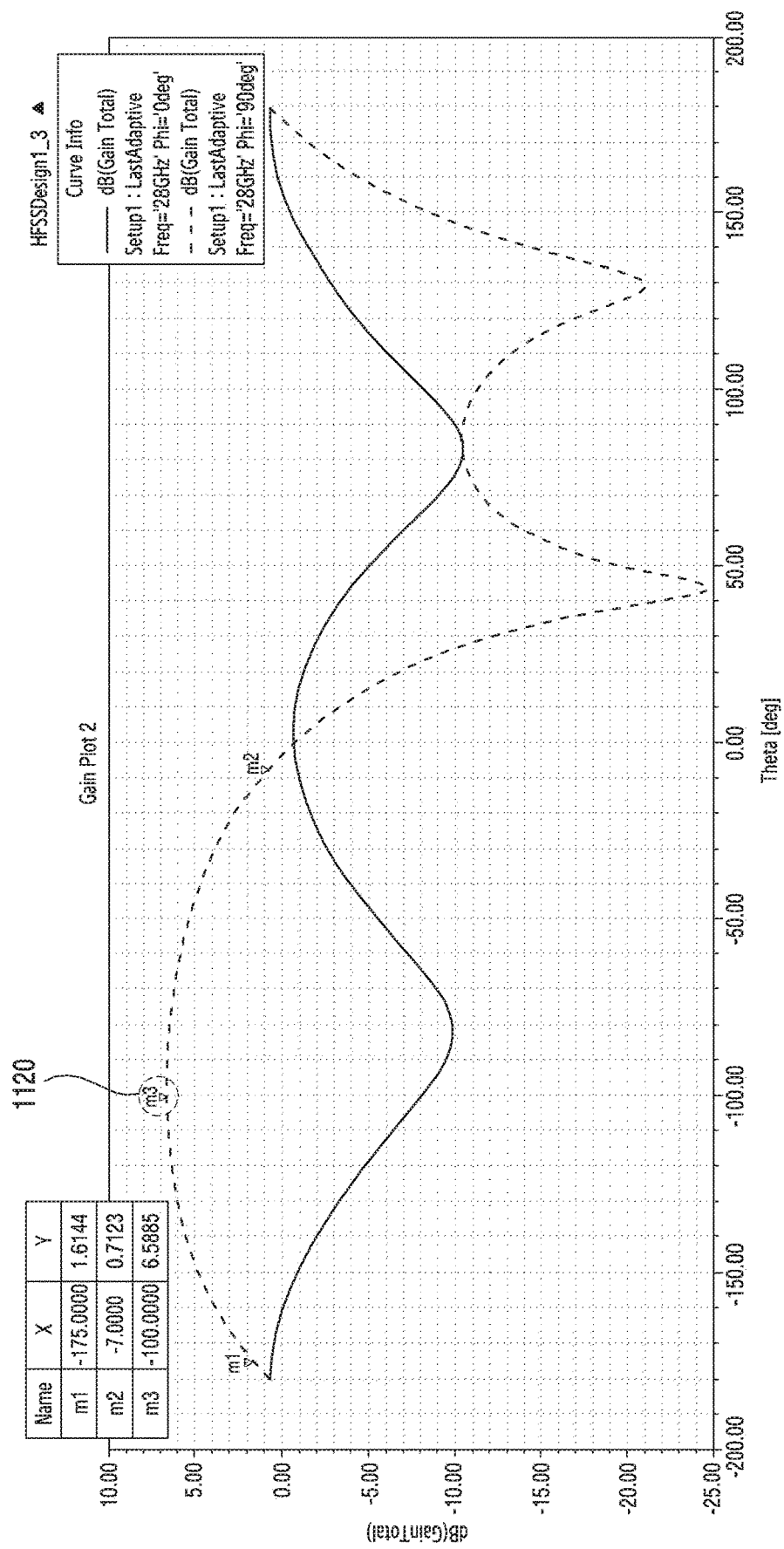
FIG. 11B is a graph illustrating a reflection coefficient of the communication unit of FIG. 10 according to various embodiments of the disclosure.

FIG. 11B is a graph illustrating a reflection coefficient of the communication unit 1020 of FIG. 10 according to various embodiments of the disclosure. It can be found that a gain of 6.5 dB is obtained with respect to the elevation direction (theta), and an effect of improving a gain of about 1.5 dB compared to the existing gain is obtained (e.g., a region 1120 of FIG. 11B).

Figure 12A:
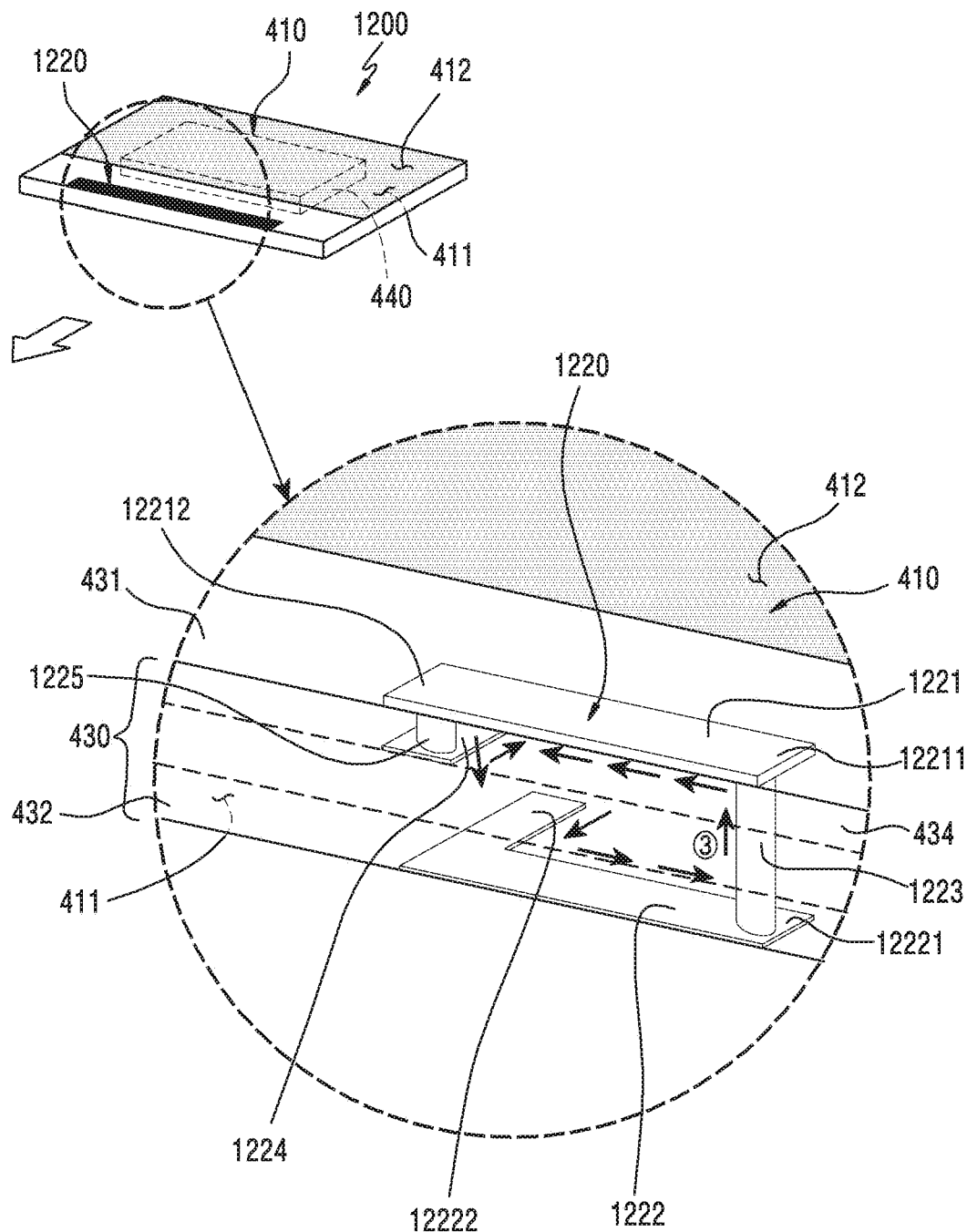
FIG. 12A is a perspective view of a communication unit according to various embodiments of the disclosure.
Figure 12B:
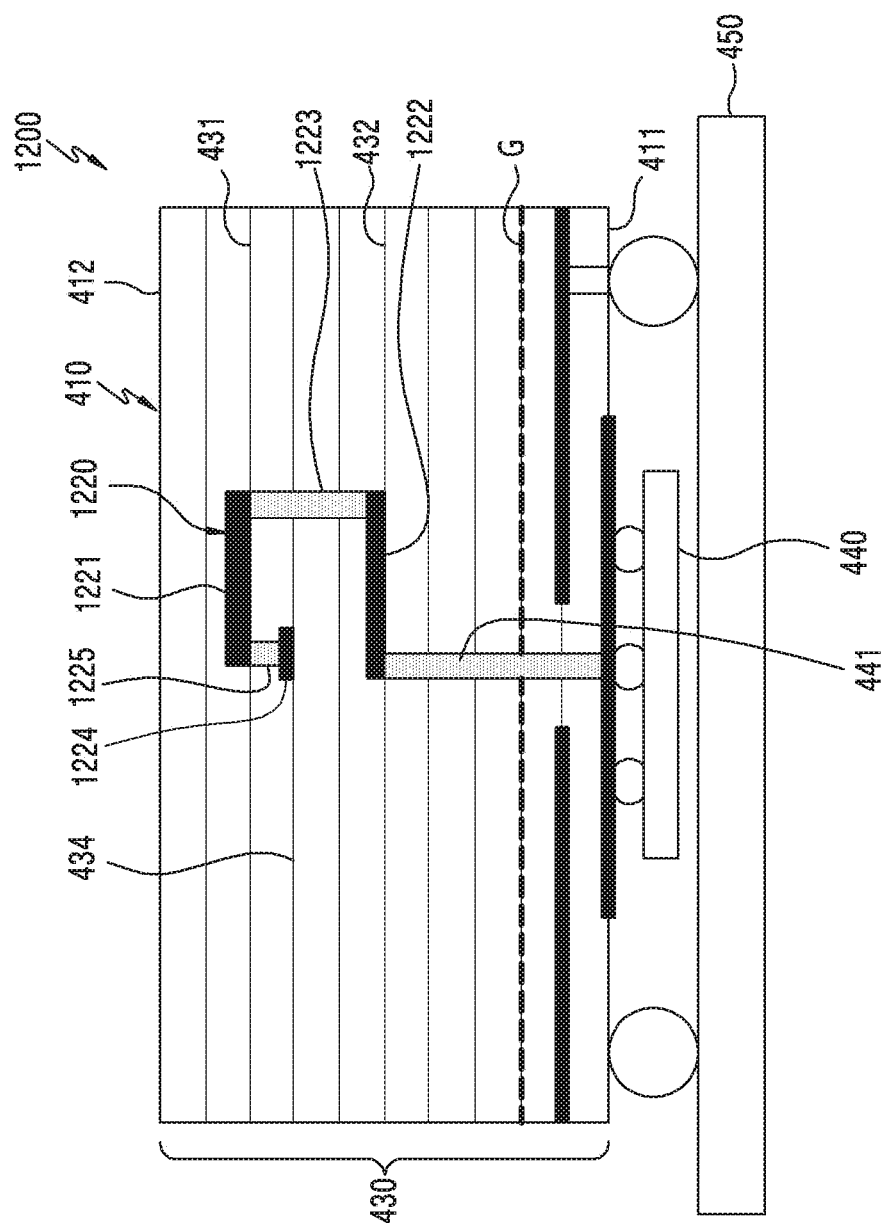
FIG. 12B is a sectional view illustrating a stacked structure of the communication unit of FIG. 12A according to various embodiments of the disclosure.

FIG. 12A is a perspective view of a communication unit according to various embodiments of the disclosure. FIG. 12B is a sectional view illustrating a stacked structure of the communication unit of FIG. 12A according to various embodiments of the disclosure.

The communication unit 1200 of FIG. 12A may be at least partly similar to the communication units 310, 320, 330, and 340 of FIG. 3A, or include other embodiments of the communication units. In describing the communication unit 1200 of FIGS. 12A and 12B, the same reference signs are used for constituent elements identical or similar to those of the communication unit 400 of FIGS. 4A and 4B.

Referring to FIGS. 12A and 12B, the communication unit 1200 may include a board 410. According to an embodiment, the board 410 may include a first surface 411 and a second surface 412 that faces away from the first surface 411. According to an embodiment, the board 410 may include a loop antenna 1220 that is substantially disposed in an edge region of the board 410. According to an embodiment, the loop antenna 1220 may include a first conductive pattern 1221, a second conductive pattern 1222, or a third conductive pattern 1224 that are electrically connected to one another. According to an embodiment, the communication unit 1200 may include a wireless communication circuit 440 that is disposed on the first surface 411 of the board 410. According to an embodiment, the wireless communication circuit 440 may be set to transmit/receive signals having frequencies of a range of about 3 GHz to 100 GHz.

According to various embodiments, at least a part of the loop antenna 1220 may be disposed on at least some of a plurality of insulating layers 430, inclusive of the first surface 411 and/or the second surface 412 of the board 410. Without being limited thereto, the loop antenna 1220 may be disposed between at least some of the plurality of insulating layers 430 that form the board 410, rather than the first surface 411 and the second surface 412 of the board 410. According to an embodiment, a distance between at least some of the plurality of insulating layers 430 contributing to a thickness of the board 410 may be used as an electric length (e.g., a radiation path) for the loop antenna 1220.

According to various embodiments, the loop antenna 1220 may include a first conductive pattern 1221 that is disposed on a first plane 431 of any one of the plurality of insulating layers 430, a second conductive pattern 1222 that is disposed on a second plane 432 parallel to the first plane 431, and a third conductive pattern 1224 that is spaced apart from the second conductive pattern 1222 at a constant interval and is disposed on a fourth plane 434. According to an embodiment, the first plane 431, the second plane 432, and the fourth plane 434 are disposed parallel to one another, and are not disposed on the same plane. According to an embodiment, the fourth plane 434 may be disposed between the first plane 431 and the second plane 432.

According to various embodiments, one end 12211 of the first conductive pattern 1221 may be electrically connected with one end 12221 of the second conductive pattern 1222 through a first conductive via 1223 that is formed in such a way as to pass through at least some of the plurality of insulating layers 430 in a longitudinal direction (a thickness direction of the board). According to an embodiment, the other end 12212 of the first conductive pattern 1221 may be electrically connected with the third conductive pattern 1224 through a second conductive via 1225 that is formed in such a way as to pass through at least some of the plurality of insulating layers 430 in a longitudinal direction. According to an embodiment, the third conductive pattern 1224 may be electrically connected to a ground plane G of the board 410, and the other end 12222 of the second conductive pattern 1222 may be electrically connected to the wireless communication circuit 440 disposed on the first surface 411 of the board 410. According to an embodiment, the third conductive pattern 1224 and the ground plane G may be electrically connected through a grounding via (not illustrated). As another example, the second conductive pattern 1222 and the wireless communication circuit 440 may also be electrically connected through a power-supplying via 441.

According to various embodiments, the loop antenna 1220 may be operated as a loop type antenna having a radiation path (e.g., a path ①) that is supplied with power from the other end 12222 of the second conductive pattern 1222 and is connected to the ground plane G of the board 410 through the first conductive via 1223, the first conductive pattern 1221, the second conductive via 1225, and the third conductive pattern 1224. Without being limited thereto, the loop antenna 1220 has a radiation path opposite to the above-mentioned radiation path even if a power-supplying position and a grounding position are exchanged with each other, and thereby the same radiation performance can be ensured. According to an embodiment, when the second surface 412 of the board 410 is viewed from above, a power-supplying portion of the second conductive pattern 1222 and a ground portion of the third conductive pattern 1224 are generally disposed in such a way as to at least partly overlap each other, and thereby a compact loop antenna structure can be implemented.

According to various embodiments, although not illustrated, the loop antenna 1220 of FIG. 12A may include the above-mentioned conductive lateral connecting members of FIG. 4C (e.g., the conductive lateral connecting members 461 and 462 of FIG. 4C) that are disposed on the lateral surface (e.g., the lateral surface 413 of FIG. 4C) of the board 410 instead of the conductive vias 1223 and 1225.

Figure 13A:
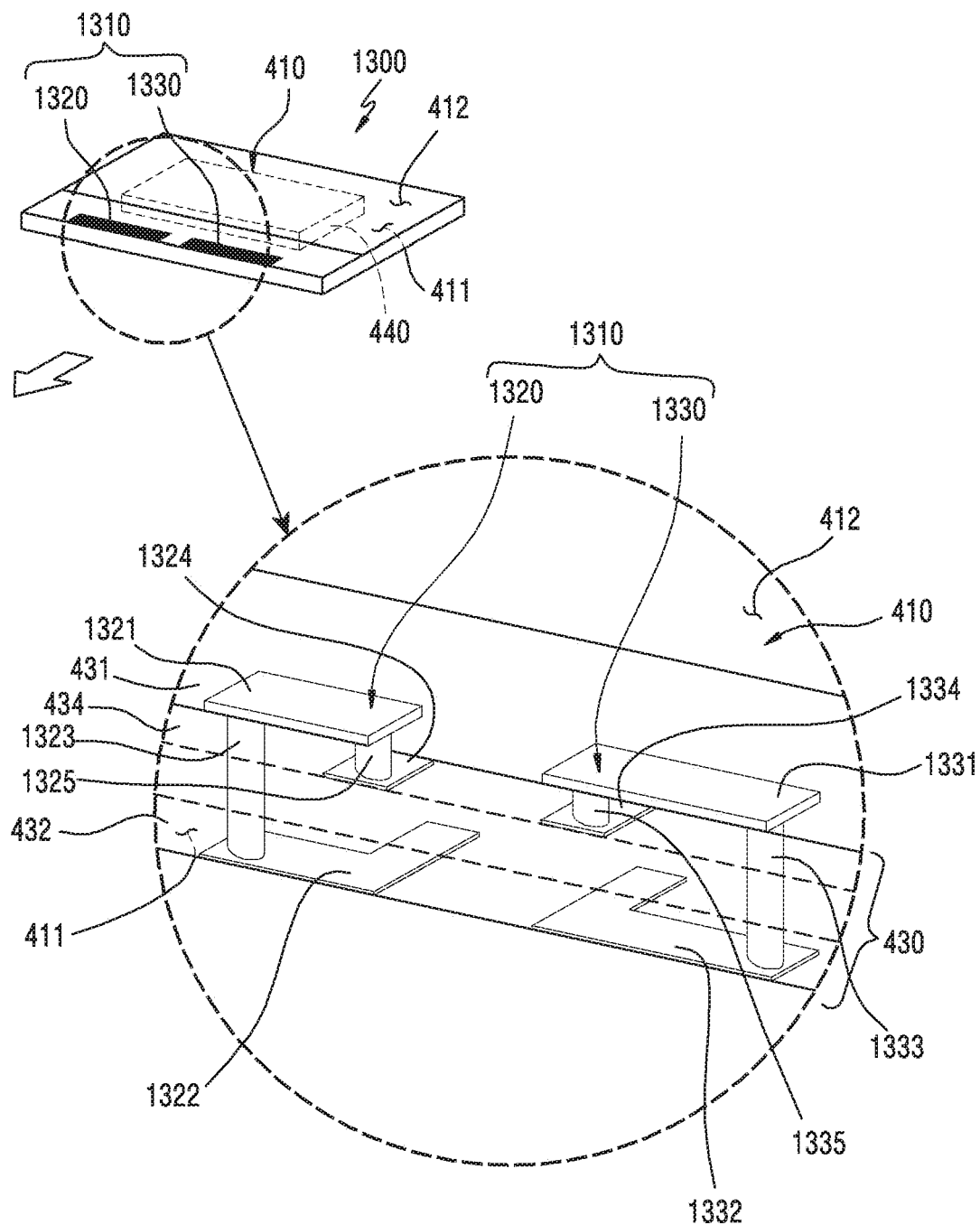
FIG. 13A is a perspective view of a communication unit according to various embodiments of the disclosure.
Figure 13B:
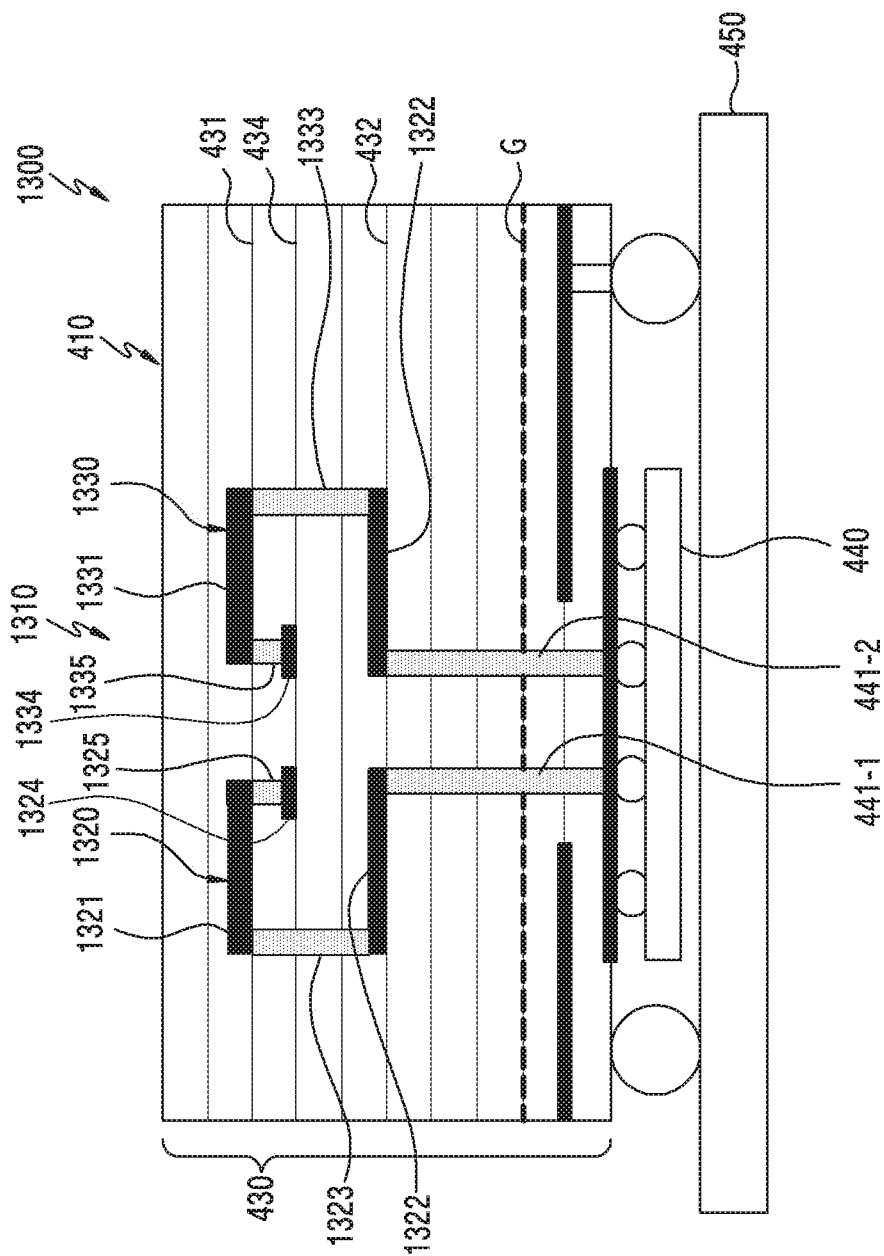
FIG. 13B is a sectional view illustrating a stacked structure of the communication unit of FIG. 4A according to various embodiments of the disclosure.

FIG. 13A is a perspective view of a communication unit according to various embodiments of the disclosure. FIG. 13B is a sectional view illustrating a stacked structure of the communication unit of FIG. 4A according to various embodiments of the disclosure.

The communication unit 1300 of FIG. 13A may be at least partly similar to the communication units 310, 320, 330, and 340 of FIG. 3A, or include other embodiments of the communication units. In describing the communication unit 1300 of FIGS. 13A and 13B, the same reference signs are used for constituent elements identical or similar to those of the communication unit 400 of FIGS. 4A and 4B.

The communication unit 1300 of FIGS. 13A and 13B may be configured such that an output signal is coupled to a differential loop array structure by disposing the loop antenna 1220 of FIG. 12A in bilateral symmetry and electrically connecting the loop antennas 1220 to a wireless communication circuit 440.

Referring to FIGS. 13A and 13B, the communication unit 1300 may include a board 410. According to an embodiment, the board 410 may include a first surface 411 and a second surface 412 that faces away from the first surface 411. According to an embodiment, the board 410 may include a loop antenna 1310 that is substantially disposed in an edge region of the board 410. According to an embodiment, the loop antenna 1310 may include a first loop antenna 1320 and a second loop antenna 1330 that are electrically connected to the wireless communication circuit 440 and are disposed in symmetry with each other. According to an embodiment, the communication unit 1300 may include the wireless communication circuit 440 that is disposed on the first surface 411 of the board 410. According to an embodiment, the wireless communication circuit 440 may be set to transmit/receive signals having frequencies of a range of about 3 GHz to 100 GHz through the first loop antenna 1320 and the second loop antenna 1330.

According to various embodiments, at least a part of the loop antenna 1310 may be disposed on at least some of a plurality of insulating layers 430, inclusive of the first surface 411 and/or the second surface 412 of the board 410. Without being limited thereto, the loop antenna 1310 may be disposed between at least some of the plurality of insulating layers 430 that form the board 410, rather than the first surface 411 and the second surface 412 of the board 410. According to an embodiment, a distance between at least some of the plurality of insulating layers 430 contributing to a thickness of the board 410 may be used as an electric length (e.g., a radiation path) for the loop antenna 1310.

According to various embodiments, the first loop antenna 1320 may include a first conductive pattern 1321 that is disposed on a first plane 431 of any one of the plurality of insulating layers 430, a second conductive pattern 1322 that is disposed on a second plane 432 parallel to the first plane 431, and a third conductive pattern 1324 that is spaced apart from the second conductive pattern 1322 at a constant interval and is disposed on a fourth plane 434. According to an embodiment, the first plane 431, the second plane 432, and the fourth plane 434 are disposed parallel to one another, and are not disposed on the same plane. According to an embodiment, the fourth plane 434 may be disposed between the first plane 431 and the second plane 432. According to an embodiment, the first conductive pattern 1321 may be electrically connected with the second conductive pattern 1322 through a first conductive via 1323 that is formed in such a way as to pass through at least some of the plurality of insulating layers 430 in a longitudinal direction (a thickness direction of the board). According to an embodiment, the first conductive pattern 1321 may be electrically connected with the third conductive pattern 1324 through a second conductive via 1325 that is formed in such a way as to pass through at least some of the plurality of insulating layers 430 in a longitudinal direction. According to an embodiment, the third conductive pattern 1324 may be electrically connected to a ground plane G of the board 410 and, as another example, the second conductive pattern 1322 may be electrically connected to the wireless communication circuit 440 disposed on the first surface 411 of the board 410. According to an embodiment, the third conductive pattern 1324 and the ground plane G may be electrically connected through a grounding via (not illustrated). As another example, the second conductive pattern 1322 and the wireless communication circuit 440 may also be electrically connected through a power-supplying via 441-1.

According to various embodiments, the second loop antenna 1330 may include a fourth conductive pattern 1331 that is disposed on the first plane 431, a fifth conductive pattern 1332 that is disposed on the second plane 432 parallel to the first plane 431, and a sixth conductive pattern 1334 that is spaced apart from the fifth conductive pattern 1332 at a constant interval and is disposed on the fourth plane 434. According to an embodiment, the fourth conductive pattern 1331 may be electrically connected with the fifth conductive pattern 1332 through a third conductive via 1333 that is formed in such a way as to pass through at least some of the plurality of insulating layers 430 in the longitudinal direction (the thickness direction of the board). According to an embodiment, the fourth conductive pattern 1331 may be electrically connected with the sixth conductive pattern 1334 through a fourth conductive via 1335 that is formed in such a way as to pass through at least some of the plurality of insulating layers 430 in the longitudinal direction. According to an embodiment, the sixth conductive pattern 1334 may be electrically connected to the ground plane G of the board 410. As another example, the fifth conductive pattern 1332 may be electrically connected to the wireless communication circuit 440 disposed on the first surface 411 of the board 410. According to an embodiment, the sixth conductive pattern 1334 and the ground plane G may be electrically connected through a grounding via (not illustrated). As another example, the fifth conductive pattern 1332 and the wireless communication circuit 440 may also be electrically connected through a power-supplying via 441-2.

According to various embodiments, the first loop antenna 1320 may be operated as a loop type antenna having a radiation path that is supplied with power from the second conductive pattern 1322 and is connected to the ground plane G of the board 410 through the first conductive via 1323, the first conductive pattern 1321, the second conductive via 1325, and the third conductive pattern 1324. According to an embodiment, second loop antenna 1330 may be operated as a loop type antenna having a radiation path that is supplied with power from the fifth conductive pattern 1332 and is connected to the ground plane G of the board 410 through the third conductive via 1333, the fourth conductive pattern 1331, the fourth conductive via 1335, and the sixth conductive pattern 1334.

According to various embodiments, although not illustrated, the loop antenna 1310 of FIG. 13A may include the above-mentioned conductive lateral connecting members of FIG. 4C (e.g., the conductive lateral connecting members 461 and 462 of FIG. 4C) that are disposed on the lateral surface (e.g., the lateral surface 413 of FIG. 4C) of the board 410 instead of the conductive vias 1323, 1325, 1333, and 1335.

Figure 14A:
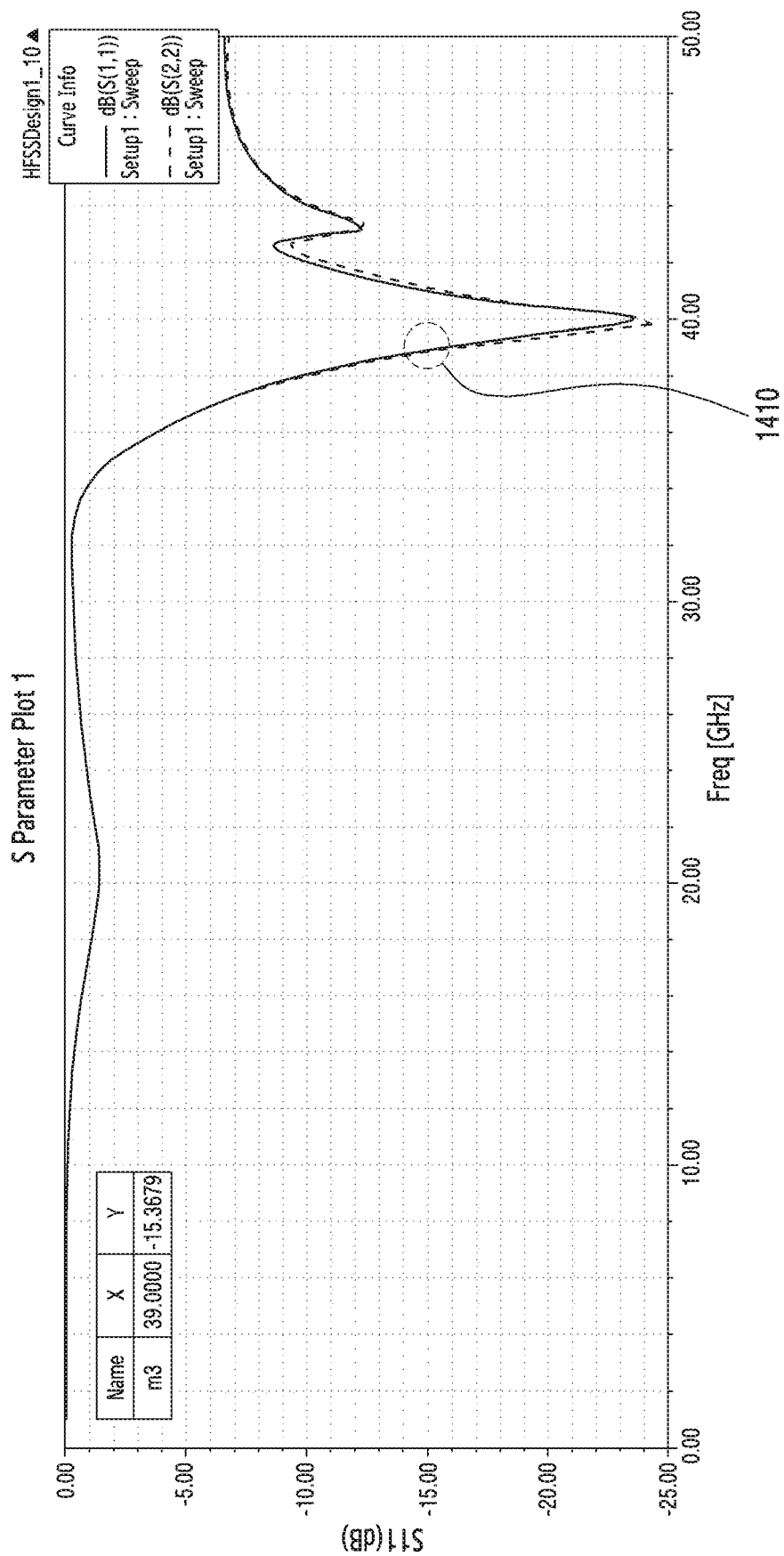
FIGS. 14A and 14B are graphs illustrating a reflection coefficient and gain of the communication unit of FIG. 13A according to various embodiments of the disclosure.
Figure 14B:
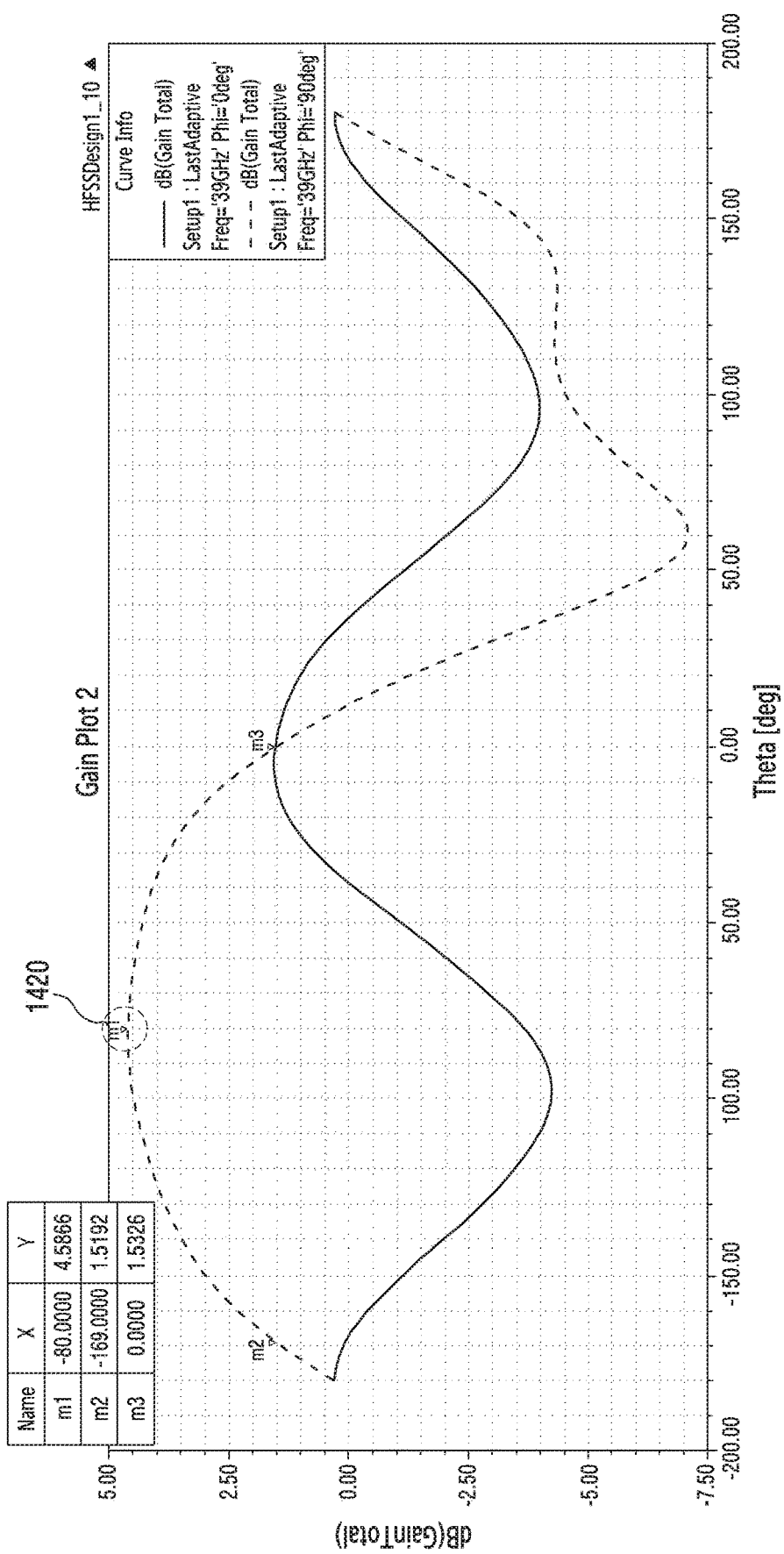

FIGS. 14A and 14B are graphs illustrating a reflection coefficient and gain of the communication unit 1310 of FIG. 13A according to various embodiments of the disclosure. It can be found that a loop antenna array shows resonance characteristics of −15 dB or higher at S11 (e.g., a region 1410 of FIG. 14A). Further, a gain of 4.5 dB within a wide 3-dB bandwidth of about 169° at about 39 GHz can be secured (e.g., a region 1420 of FIG. 14B).

Figure 15A:
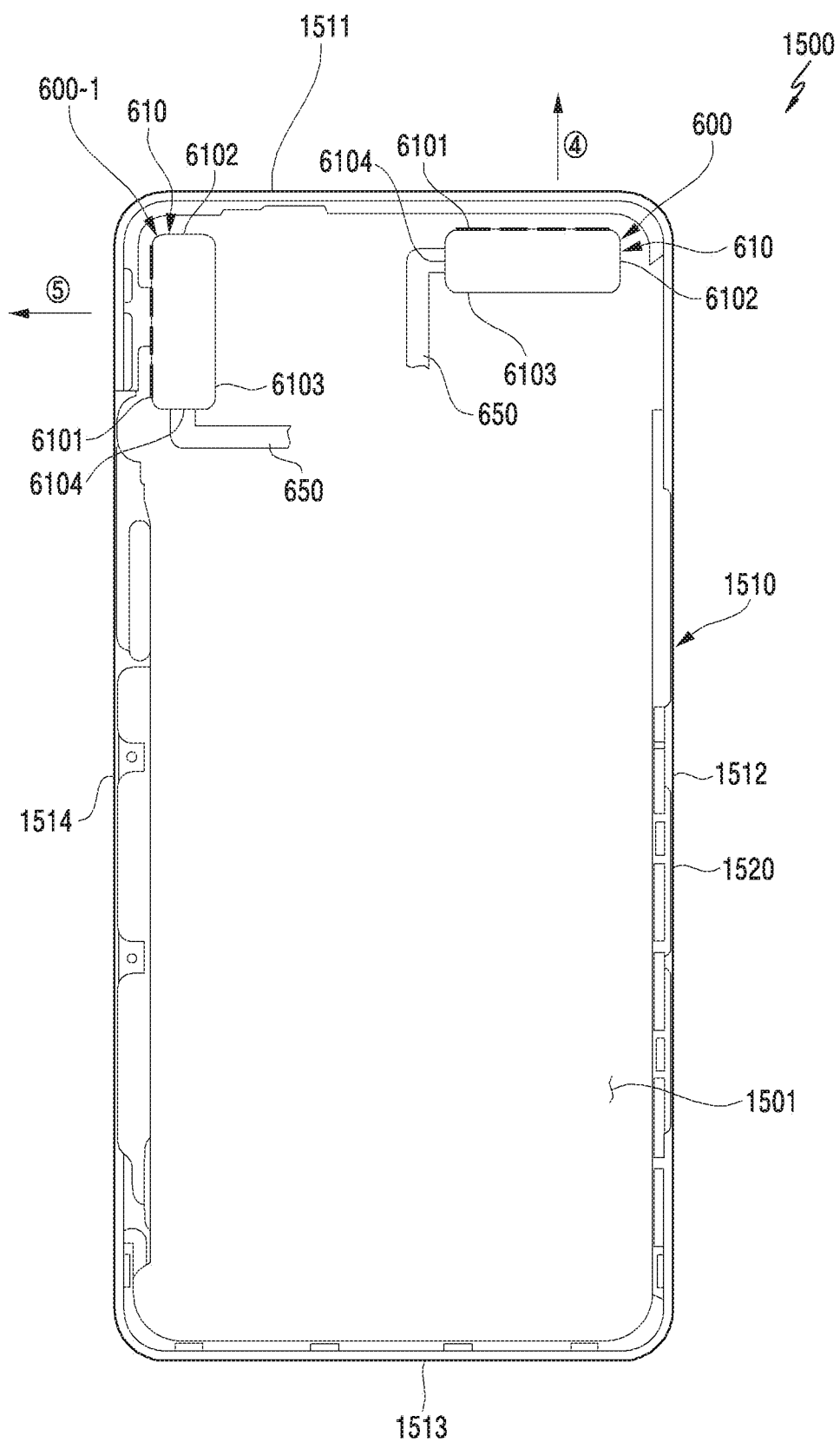
FIGS. 15A and 15B are views illustrating a layout of a communication unit according to various embodiments of the disclosure.
Figure 15B:
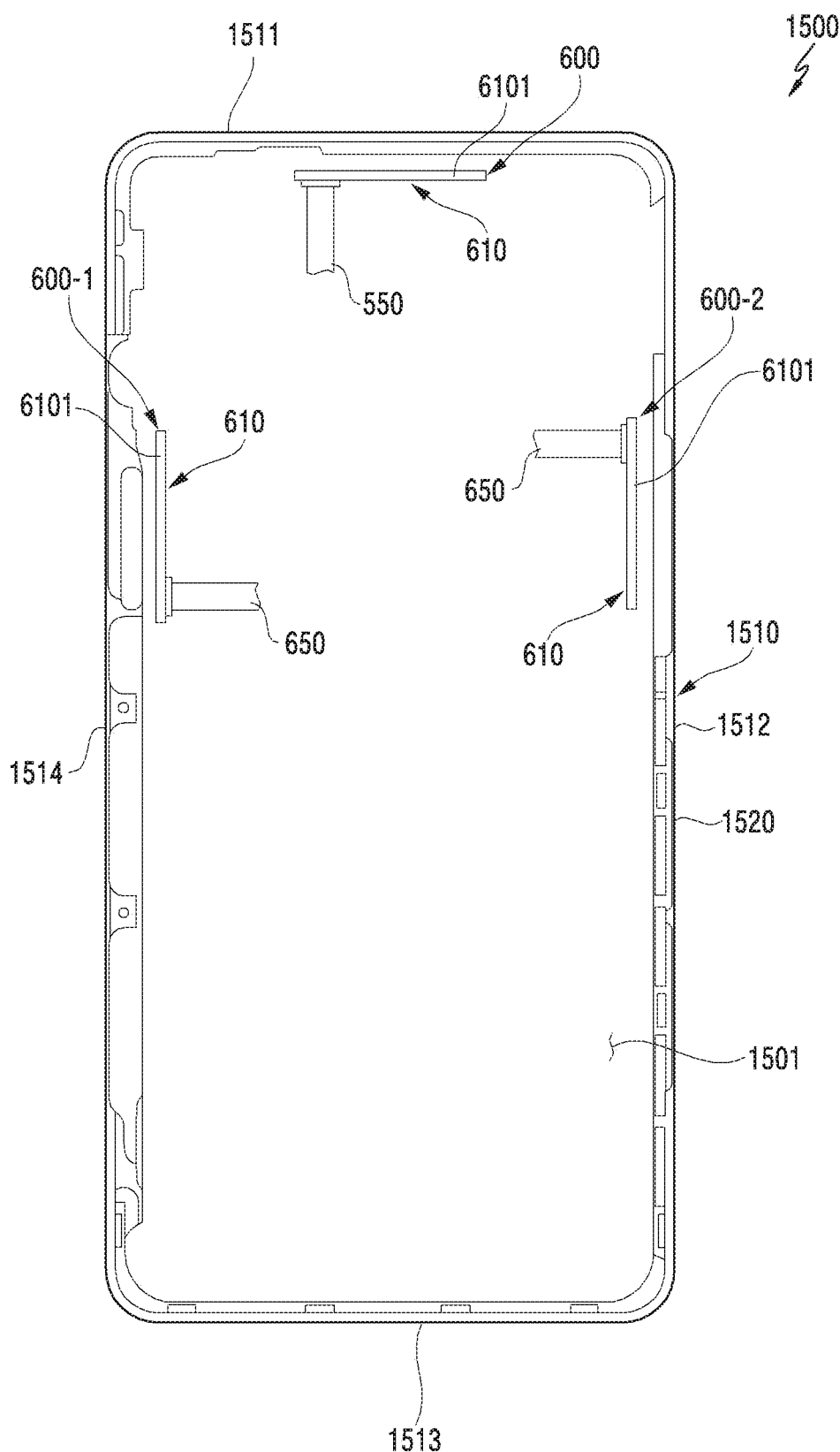

FIGS. 15A and 15B are views illustrating a layout of a communication unit according to various embodiments of the disclosure.

In FIGS. 15A and 15B, the communication unit is described with the communication unit 600 of FIG. 6 given as an example, but not limited thereto. For example, the communication unit of FIGS. 15A and 15B may be replaced with the loop antenna 420 included in the communication unit 400 of FIG. 4A, the loop antenna 820 included in the communication unit 800 of FIG. 8A, the loop antenna 1020 included in the communication unit 1000 of FIG. 10, the loop antenna 1220 included in the communication unit 1200 of FIG. 12A, or the loop antenna 1310 included in the communication unit 1300 of FIG. 13A, or a communication unit in which each of the loop antennas is implemented in an array type as in FIG. 6.

Referring to FIG. 15A, an electronic device 1500 may include a housing 1510. According to an embodiment, the housing 1510 may include a lateral member 1520. According to an embodiment, at least a partial region of the lateral member 1520 may be formed of a conductive member, be implemented into a unit conductive portion by a non-conductive portion, and be operated as an antenna radiator.

According to various embodiments, the housing 1510 may include a first portion 1511 having a first length, a second portion 1512 that extends in a direction perpendicular to the first portion 1511 and has a second length, a third portion 1513 that extends from the second portion 1512 in parallel to the first portion 1511 so as to have the first length, and a fourth portion 1514 that extends from the third portion 1513 in parallel to the second portion 1512 so as to have the second length.

According to various embodiments, a first communication unit 600 or a second communication unit 600-1 may be disposed in an internal space 1501 of the electronic device 1500. According to an embodiment, the first communication unit 600 or the second communication unit 600-1 may be disposed at at least one corner portion of the electronic device 1500 having a substantially quadrilateral shape.

According to various embodiments, a first lateral portion 6101 of the first communication unit 600 may be disposed adjacent to the first portion 1511 of the housing 1510, and a second lateral portion 6102 of the first communication unit 600 may be disposed adjacent to the second portion 1512 of the housing 1510. In this case, an electric connecting member 650 (e.g., a power terminal and/or an RF terminal) of a communication unit 520 may be drawn from a fourth lateral portion 6104 in a center direction of the electronic device 1500. As another example, the electric connecting member 650 may be drawn from a third lateral portion 6103 in the center direction of the electronic device 1500. According to an embodiment, the electric connecting member 650 may be formed integrally with the communication unit, or be connected with the communication unit through a separate electric connecting member (e.g., a coaxial cable or an FPCB). According to an embodiment, a first lateral portion 6101 of the second communication unit 600-1 may be disposed adjacent to the fourth portion 1514 of the housing 1510, and a second lateral portion 6102 of the second communication unit 600-1 may be disposed adjacent to the first portion 1511 of the housing 1510.

According to various embodiments, the first communication unit 600 may be disposed such that a beam pattern is formed in a direction (e.g., a direction ④) of the first portion 1511 of the electronic device 1500. According to an embodiment, the second communication unit 600-1 may be disposed such that a beam pattern is formed in a direction (e.g., a direction ⑤) of the fourth portion 1514 of the electronic device 1500.

Referring to FIG. 15B, the first communication unit 600, the second communication unit 600-1, or a third communication unit 600-2 may be disposed in regions of some corners of the electronic device 1500. According to an embodiment, the first communication unit 600 may be disposed such that a second surface (e.g., the second surface 612 of FIG. 6) of a board (e.g., the board 610 of FIG. 6) faces the first portion 1511 in substantially the center of the first portion 1511 of the housing 1510. According to an embodiment, when a second plate (e.g., the second plate 211 of FIG. 2B) of the electronic device 1500 is viewed from above, the first communication unit 600 may be disposed in such a way that the first lateral portion 6101 of the board 610 is parallel to the first portion 1511 of the housing 1510. According to an embodiment, the second communication unit 600-1 may be disposed in such a way that the second surface (e.g., the second surface 612 of FIG. 6) of the board (e.g., the board 610 of FIG. 6) is adjacent and parallel to the fourth portion 1514 in a partial region of the fourth portion 1514 of the housing 1510. According to an embodiment, the third communication unit 600-2 may be disposed in such a way that the second surface (e.g., the second surface 612 of FIG. 6) of the board (e.g., the board 610 of FIG. 6) is adjacent and parallel to the second portion 1512 in a partial region of the second portion 1512 of the housing 1510.

According to various embodiments, the first communication unit 600, the second communication unit 600-1, or the third communication unit 600-3 may form a beam pattern in a direction (e.g., a −Z direction of FIG. 2A) of a rear plate (e.g., the rear plate 211 of FIG. 2A) of the housing 1510.

According to various embodiments, although not illustrated, the communication units 600, 600-1, and 600-2 illustrated in FIG. 15A and/or FIG. 15B may be disposed at each corner of the electronic device having a substantially rectangular shape, at least a partial region of each edge, or a corner or edge by mixture. According to an embodiment, the communication units 600, 600-1, and 600-2 may be disposed in such various ways that the beam pattern directions of FIGS. 15A and 15B can be mixed inside the electronic device.

According to various embodiments, regions of the housing 1510 which correspond to portions where the communication units 600, 600-1, and 600-2 are mounted may be formed of a material (e.g., a dielectric material) other than a conductive material in order to prevent radiation performance degradation of the communication units. Without being limited thereto, the corresponding regions of the housing 1510 may be replaced by holes formed in the housing in directions in which the beam patterns of the communication units are formed, or metal periodic structures (e.g., metal grids) through which a beam can pass.

According to various embodiments, an electronic device (e.g., an electronic device 200 of FIG. 2A) may include: a housing (e.g., a housing 210 of FIG. 2A) that includes a first plate (e.g., a front plate 202 of FIG. 2A), a second plate (e.g., a rear plate 211 of FIG. 2B) facing away from the first plate, and a lateral member (e.g., a lateral bezel structure (or a "lateral member") 218 of FIG. 2A) surrounding a space between the first plate and the second plate; an antenna structure (e.g., a communication unit 400 of FIG. 4A), wherein the antenna structure includes a plurality of insulating layers (e.g., a plurality of insulating layers 430 of FIG. 4A) disposed in such a way as to be stacked parallel to the first plate, and an array of loop antennas formed through the insulating layers and/or peripheries of the insulating layers; and a wireless communication circuit that is electrically connected to the loop antennas (e.g., loop antennas 621, 622, 623, and 624 of FIG. 6) and is set to transmit/receive a first signal having a first frequency of a range of about 3 GHz to 100 GHz.

According to various embodiments, at least one of the loop antennas may include: a first conductive pattern (e.g., a first conductive pattern 421 of FIG. 4A) that is disposed on a first plane (e.g., a first plane 431 of FIG. 4A) parallel to the insulating layers; a second conductive pattern (e.g., a second conductive pattern 422 of FIG. 4A) that is disposed on a second plane (e.g., a second plane 432 of FIG. 4A) parallel to the first plane; a third conductive pattern (e.g., a third conductive pattern 423 of FIG. 4A) that is disposed on the second plane; a first conductive via (e.g., a first conductive via 424 of FIG. 4A) that electrically connects the first conductive pattern and the second conductive pattern through the insulating layers (e.g., the insulating layers 430 of FIG. 4A); and a second conductive via (e.g., a second conductive via 425 of FIG. 4A) that electrically connects the first conductive pattern and the third conductive pattern through the insulating layers.

According to various embodiments, the at least one of the loop antennas may further include: a fourth conductive pattern (e.g., a fourth conductive pattern 426 of FIG. 8A) that is disposed on a third plane (e.g., a third plane 433 of FIG. 8A) parallel to the first plane, wherein the first plane is interposed between the second plane and the third plane; and a third conductive via (e.g., a third conductive via 427 of FIG. 8A) that electrically connects the first conductive pattern and the fourth conductive pattern through the insulating layers.

According to various embodiments, the third conductive via may be aligned with the second conductive via in a row.

According to various embodiments, the wireless communication circuit may be set to transmit/receive a second signal having a second frequency different from the first frequency.

According to various embodiments, the electronic device may further include a ground plane (e.g., a ground plane G of FIG. 4B) formed through the insulating layers and/or the peripheries of the insulating layers, wherein the third conductive pattern may be electrically connected to the wireless communication circuit, and the second conductive pattern and the fourth conductive pattern may be electrically connected to the ground plane.

According to various embodiments, the wireless communication circuit may transmit/receive the first signal using a loop type radiation path that is connected to the ground plane through the third conductive pattern, the second conductive via, the first conductive pattern, the first conductive via, and the second conductive pattern.

According to various embodiments, the wireless communication circuit may transmit/receive the second signal using a loop type radiation path that is connected to the ground plane through the third conductive pattern, the second conductive via, the third conductive via, and the fourth conductive pattern.

According to various embodiments, the electronic device may further include a ground plane formed through the insulating layers and/or the peripheries of the insulating layers, wherein the third conductive pattern may be electrically connected to the wireless communication circuit, and the second conductive pattern may be electrically connected to the ground plane.

According to various embodiments, at least one of the loop antenna may include: a first conductive pattern (e.g., a first conductive pattern 1221 of FIG. 12A) that is disposed on a first plane parallel to the insulating layers; a second conductive pattern (e.g., a second conductive pattern 1222 of FIG. 12A) that is disposed on a second plane parallel to the first plane; a third conductive pattern (e.g., a third conductive pattern 1224 of FIG. 12A) that is disposed on a third plane (e.g., a third plane 434 of FIG. 12A) between the first plane and the second plane; a first conductive via (e.g., a first conductive via 1223 of FIG. 12A) that electrically connects the first conductive pattern and the second conductive pattern through the insulating layers; and a second conductive via (e.g., a second conductive via 1225 of FIG. 12A) that electrically connects the first conductive pattern and the third conductive pattern through the insulating layers.

According to various embodiments, the electronic device may further include a ground plane formed through the insulating layers and/or the peripheries of the insulating layers, wherein the second conductive pattern may be electrically connected to the wireless communication circuit, and the third conductive pattern may be electrically connected to the ground plane.

According to various embodiments, when the second plate is viewed from above, a first point of the second conductive pattern which is connected with the wireless communication circuit may be disposed to at least partly overlap a second point of the third conductive pattern which is connected with the ground plane.

According to various embodiments, the wireless communication circuit may transmit/receive the first signal using a loop type radiation path that is connected to the ground plane through the second conductive pattern, the first conductive via, the first conductive pattern, the second conductive via, and the third conductive pattern.

According to various embodiments, the electronic device may further include a conductive director (e.g., a conductive director 460 of FIG. 10) formed in a size that at least overlaps the first conductive pattern, the second conductive pattern, and the third conductive pattern when the plurality of insulating layers is viewed from a lateral surface.

According to various embodiments, the conductive director may be disposed in such a way as to perpendicularly intersect the insulating layers.

According to various embodiments, the conductive director may be disposed adjacent to the loop antennas in at least a partial region of the housing.

According to various embodiments, at least one of the loop antennas may include first loop antenna and a second loop antenna that are symmetric with each other and are electrically connected to the wireless communication circuit, the first loop antenna may include a first conductive pattern that is disposed on a first plane parallel to the insulating layers, a second conductive pattern that is disposed on a second plane parallel to the first plane, a third conductive pattern that is disposed on a third plane between the first plane and the second plane, a first conductive via that electrically connects the first conductive pattern and the second conductive pattern through the insulating layers, and a second conductive via that electrically connects the first conductive pattern and the third conductive pattern through the insulating layers, and the second loop antenna may include a fourth conductive pattern that is disposed on the first plane parallel to the insulating layers, a fifth conductive pattern that is disposed on the second plane parallel to the first plane, a sixth conductive pattern that is disposed on the third plane between the first plane and the second plane, a third conductive via that electrically connects the fourth conductive pattern and the fifth conductive pattern through the insulating layers, and a fourth conductive via that electrically connects the fourth conductive pattern and the sixth conductive pattern through the insulating layers.

According to various embodiments, the electronic device may further include a ground plane formed through the insulating layers and/or the peripheries of the insulating layers, wherein the second conductive pattern and the fifth conductive pattern may be electrically connected to the wireless communication circuit, and the third conductive pattern and the sixth conductive pattern may be electrically connected to the ground plane.

According to various embodiments, when the second plate is viewed from above, a first point of the second conductive pattern which is connected with the wireless communication circuit may be disposed to at least partly overlap a second point of the third conductive pattern which is connected with the ground plane, and when the second plate is viewed from above, a third point of the fifth conductive pattern which is connected with the wireless communication circuit may be disposed to at least partly overlap a fourth point of the sixth conductive pattern which is connected with the ground plane.

According to various embodiments, the array of the loop antennas may be provided on a board having the plurality of insulating layers, the board may include a lateral surface, and at least one of the loop antennas may include a first conductive pattern that is disposed on a first plane parallel to the insulating layers, a second conductive pattern that is disposed on a second plane parallel to the first plane, a third conductive pattern that is disposed on the second plane, a first conductive lateral connecting member that electrically connects the first conductive pattern and the second conductive pattern through the lateral surface of the board, and a second conductive lateral connecting member that electrically connects the first conductive pattern and the third conductive pattern through the lateral surface of the board.

According to various embodiments, the first conductive lateral connecting member and/or the second conductive lateral connecting member may include a plating member disposed on the lateral surface of the board, and/or a conductive paint applied to the lateral surface of the board.

Embodiments of the disclosure disclosed herein and the drawings merely specific examples to easily describe technical contents according to the embodiments of the disclosure and to help easy understanding of the embodiments of the disclosure, and are not intended to limit the scope of the embodiments of the disclosure. Thus, it should be interpreted that the scope of the various embodiments of the disclosure covers all alterations or modifications derived on the basis of the technical idea of the various embodiments of the disclosure, in addition to the embodiments disclosed herein.

What is claimed is:

1. An electronic device comprising:
a housing configured to include a first plate, a second plate facing away from the first plate, and a lateral member surrounding a space between the first plate and the second plate;
an antenna structure disposed in the housing, wherein the antenna structure includes:
a plurality of insulating layers, including a first surface, a second surface parallel with the first surface, and a side surface facing perpendicular to the first surface and the second surface, and
an array of loop antennas including conductive patterns, wherein the conductive patterns formed at substantially constant intervals,
wherein the conductive patterns include:
a first conductive pattern formed along the at least a portion of peripheries of the first surface of the plurality of insulating layers,
a second conductive pattern formed on the second surface,
a third conductive pattern formed on the second surface, and
connecting members are electrically connect the first conductive pattern with the second conductive pattern and the third conductive pattern; and
a wireless communication circuit electrically connected to the loop antennas and set to transmit/receive a first signal having a first frequency of a range of 3 GHz to 100 GHz.

2. The electronic device according to claim 1, wherein the connecting members include:
a first conductive via that electrically connects the first conductive pattern and the second conductive pattern through the plurality of insulating layers; and
a second conductive via that electrically connects the first conductive pattern and the third conductive pattern through the plurality of insulating layers.

3. The electronic device according to claim 2, further comprising:
a fourth conductive pattern disposed on a third surface parallel to the first surface, wherein the first surface is located between the second surface and the third surface; and
a third conductive via configured to electrically connect the first conductive pattern and the fourth conductive pattern through the plurality of insulating layers.

4. The electronic device according to claim 3, wherein the third conductive via is aligned with the second conductive via in a row.

5. The electronic device according to claim 3, wherein the wireless communication circuit is set to transmit/receive a second signal having a second frequency different from the first frequency.

6. The electronic device according to claim 5, further comprising a ground plane formed through the plurality of insulating layers and/or the peripheries of the plurality of insulating layers,
wherein the third conductive pattern is electrically connected to the wireless communication circuit, and
wherein the second conductive pattern and the fourth conductive pattern are electrically connected to the ground plane.

7. The electronic device according to claim 6, wherein the wireless communication circuit transmits/receives the first signal using a loop type radiation path that is connected to the ground plane through the third conductive pattern, the second conductive via, the first conductive pattern, the first conductive via, and the second conductive pattern.

8. The electronic device according to claim 6, wherein the wireless communication circuit transmits/receives the second signal using a loop type radiation path that is connected to the ground plane through the third conductive pattern, the second conductive via, the third conductive via, and the fourth conductive pattern.

9. The electronic device according to claim 2, further comprising a ground plane formed through the plurality of insulating layers and/or the peripheries of the plurality of insulating layers,
wherein the third conductive pattern is electrically connected to the wireless communication circuit, and
wherein the second conductive pattern is electrically connected to the ground plane.

10. The electronic device according to claim 9, wherein the wireless communication circuit transmits/receives the first signal using a loop type radiation path that is connected to the ground plane through the third conductive pattern, the second conductive via, the first conductive pattern, the first conductive via, and the second conductive pattern.

11. The electronic device according to claim 2, further comprising a conductive director formed in a size that at least overlaps the first conductive pattern, the second conductive pattern, and the third conductive pattern when the plurality of insulating layers are viewed from a lateral surface,
wherein the conductive director is disposed in such a way as to perpendicularly intersect the insulating layers.

12. The electronic device according to claim 1, wherein the connecting member comprises:
a first conductive lateral connecting member that electrically connects the first conductive pattern and the second conductive pattern through the plurality of insulating layers; and
a second conductive lateral connecting member that electrically connects the first conductive pattern and the third conductive pattern through the plurality of insulating layers.

13. The electronic device according to claim 12, further comprising a ground plane formed through the plurality of insulating layers and/or the peripheries of the plurality of insulating layers,
wherein the second conductive pattern is electrically connected to the wireless communication circuit, and
wherein the third conductive pattern is electrically connected to the ground plane.

14. The electronic device according to claim 13, wherein, when the second plate is viewed from above, a first point of the second conductive pattern which is connected with the wireless communication circuit is disposed to at least partly overlap a second point of the third conductive pattern which is connected with the ground plane.

15. The electronic device according to claim 14, wherein the wireless communication circuit transmits/receives the first signal using a loop type radiation path that is connected to the ground plane through the second conductive pattern, the first conductive lateral connecting member, the first conductive pattern, the second conductive lateral connecting member, and the third conductive pattern.

* * * * *